(12) United States Patent
Xiao et al.

(10) Patent No.: US 11,465,642 B2
(45) Date of Patent: Oct. 11, 2022

(54) REAL-TIME MAP GENERATION SYSTEM FOR AUTONOMOUS VEHICLES

(71) Applicants: Baidu USA LLC, Sunnyvale, CA (US); Baidu.com Times Technology (Beijing) Co., Ltd., Beijing (CN)

(72) Inventors: Yong Xiao, Sunnyvale, CA (US); Runxin He, Sunnyvale, CA (US); Pengfei Yuan, Beijing (CN); Li Yu, Beijing (CN); Shiyu Song, Sunnyvale, CA (US)

(73) Assignees: BAIDU USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 804 days.

(21) Appl. No.: 16/336,867

(22) PCT Filed: Jan. 30, 2019

(86) PCT No.: PCT/CN2019/073969
§ 371 (c)(1),
(2) Date: Mar. 26, 2019

(87) PCT Pub. No.: WO2020/154965
PCT Pub. Date: Aug. 6, 2020

(65) Prior Publication Data
US 2021/0370968 A1 Dec. 2, 2021

(51) Int. Cl.
*G01C 22/00* (2006.01)
*B60W 60/00* (2020.01)
(Continued)

(52) U.S. Cl.
CPC .......... *B60W 60/001* (2020.02); *G06K 9/6276* (2013.01); *G06N 20/00* (2019.01); *B60W 2420/52* (2013.01)

(58) Field of Classification Search
CPC .............. B60W 60/001; B60W 2420/52; G06N 20/00; G06K 9/6276
See application file for complete search history.

(56) References Cited

U.S. PATENT DOCUMENTS

| 2012/0194644 A1 | 8/2012 | Newcombe et al. |
| 2018/0204338 A1 | 7/2018 | Narang et al. |

(Continued)

FOREIGN PATENT DOCUMENTS

| CN | 108187241 A | 6/2018 |
| CN | 108961385 A | 12/2018 |

(Continued)

OTHER PUBLICATIONS

Pengfei Dong, et al. "A RGB-D SLAM Algorithm Combining ORB Features and BOW", CSAE 2018 Hohhot, China (2018).

*Primary Examiner* — Adam M Alharbi
(74) *Attorney, Agent, or Firm* — Womble Bond Dickinson (US) LLP

(57) ABSTRACT

In one embodiment, a system receives a stream of frames of point clouds from one or more LIDAR sensors of an ADV and corresponding poses in real-time. The system extracts segment information for each frame of the stream based on geometric or spatial attributes of points in the frame, where the segment information includes one or more segments of at least a first frame corresponding to a first pose. The system registers the stream of frames based on the segment information. The system generates a first point cloud map for the stream of frames based on the frame registration.

21 Claims, 34 Drawing Sheets

(51) Int. Cl.
    *G06N 20/00*     (2019.01)
    *G06K 9/62*     (2022.01)

(56) References Cited

U.S. PATENT DOCUMENTS

| | | | |
|---|---|---|---|
| 2019/0004535 A1 | 1/2019 | Huang et al. | |
| 2019/0180502 A1* | 6/2019 | Englard | B60W 10/04 |
| 2020/0283012 A1* | 9/2020 | Kozak | G08G 1/166 |
| 2020/0298858 A1* | 9/2020 | Stenneth | G08G 1/167 |
| 2020/0363217 A1* | 11/2020 | Zhang | G01C 21/3811 |
| 2020/0363231 A1* | 11/2020 | Pandey | G06F 16/2477 |

FOREIGN PATENT DOCUMENTS

| | | | |
|---|---|---|---|
| EP | 3324209 A1 | 5/2018 | |
| JP | 2019502214 A | 1/2019 | |
| KR | 1020180059723 A | 6/2018 | |
| KR | 1020190001668 A | 1/2019 | |

\* cited by examiner

Target map example:

Segment 1:cylindrical {(x1, y1, z1), (x2, y2, z2), ...};

Segment 2:planar {(x3, y3, z3), (x4, y4, z4), ...};

Segment 3:other {(x5, y5, z5), (x6, y6, z6), ...};

· · ·

Segment N:cylindrical {(xN, yN, zN), ...};

FIG. 13

REAL-TIME MAP GENERATION SYSTEM FOR AUTONOMOUS VEHICLES

CROSS-REFERENCE TO RELATED APPLICATION

This patent application is a U.S. National Phase Application under 35 U.S.C. § 371 of International Application No. PCT/CN2019/073969, filed Jan. 30, 2019, entitled "A REAL-TIME MAP GENERATION SYSTEM FOR AUTONOMOUS VEHICLES," which is incorporated by reference herein by its entirety.

TECHNICAL FIELD

Embodiments of the present disclosure relate generally to operating autonomous vehicles. More particularly, embodiments of the disclosure relate to a real-time map generation system for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

High-definition (HD) three dimensional (3D) point cloud map is important for autonomous vehicles, and a point cloud registration system is central to construction of a HD 3D point cloud map from point clouds data. A HD 3D point cloud map with high accuracy is key to motion planning for an autonomous driving vehicle (ADV).

However, several problems exist which influence both the performance and accuracy of map construction. First, current point cloud registration algorithms are highly dependent on a GPS signal for localization for the map construction, which can have a margin of errors in the orders of meters, or register a signal with GPS bounces, for example, in city streets lined by tall buildings or dense forest. Or the GPS may fail to register a signal altogether, for example, in tunnels or garages. Secondly, the registration of point clouds may be computational complex, e.g., challenging and time-consuming for large map areas.

Furthermore, an accuracy of a registered HD 3D point clouds map may depend on the quality of the point clouds or the splicing of the point clouds. If the point cloud map has a ghost image caused by, for example, splicing of the point clouds, accuracy of the HD 3D point cloud map may suffer. In order to ensure high accuracy, it is desirable to evaluate the point cloud map for ghosting effects.

SUMMARY

In a first aspect, embodiments of the disclosure provide a computer-implemented method to register point clouds for an autonomous driving vehicle (ADV), the method including: receiving a stream of frames of point clouds from one or more LIDAR sensors of an ADV and corresponding poses at real-time; extracting segment information for each frame of the stream based on geometric or spatial attributes of points in the frame, wherein the segment information includes one or more segments of at least a first frame corresponding to a first pose; registering the stream of frames based on the segment information; and generating a first point cloud map for the stream of frames based on the frame registration.

In a second aspect, embodiments of the disclosure provide a non-transitory machine-readable medium having instructions stored therein, which when executed by a processor, cause the processor to perform operations, the operations including: receiving a stream of frames of point clouds from one or more LIDAR sensors of an ADV and corresponding poses at real-time; extracting segment information for each frame of the stream based on geometric or spatial attributes of points in the frame, wherein the segment information includes one or more segments of at least a first frame corresponding to a first pose; registering the stream of frames based on the segment information; and generating a first point cloud map for the stream of frames based on the frame registration.

In a third aspect, embodiments of the disclosure provide a data processing system, including: a processor; and a memory coupled to the processor to store instructions, which when executed by the processor, cause the processor to perform operations, the operations including: receiving a stream of frames of point clouds from one or more LIDAR sensors of an ADV and corresponding poses at real-time; extracting segment information for each frame of the stream based on geometric or spatial attributes of points in the frame, wherein the segment information includes one or more segments of at least a first frame corresponding to a first pose; registering the stream of frames based on the segment information; and generating a first point cloud map for the stream of frames based on the frame registration.

BRIEF DESCRIPTION OF THE DRAWINGS

Embodiments of the disclosure are illustrated by way of example and not limitation in the figures of the accompanying drawings in which like references indicate similar elements.

FIG. 13 illustrates an example of a target map according to one embodiment.

DETAILED DESCRIPTION

Figure 1:
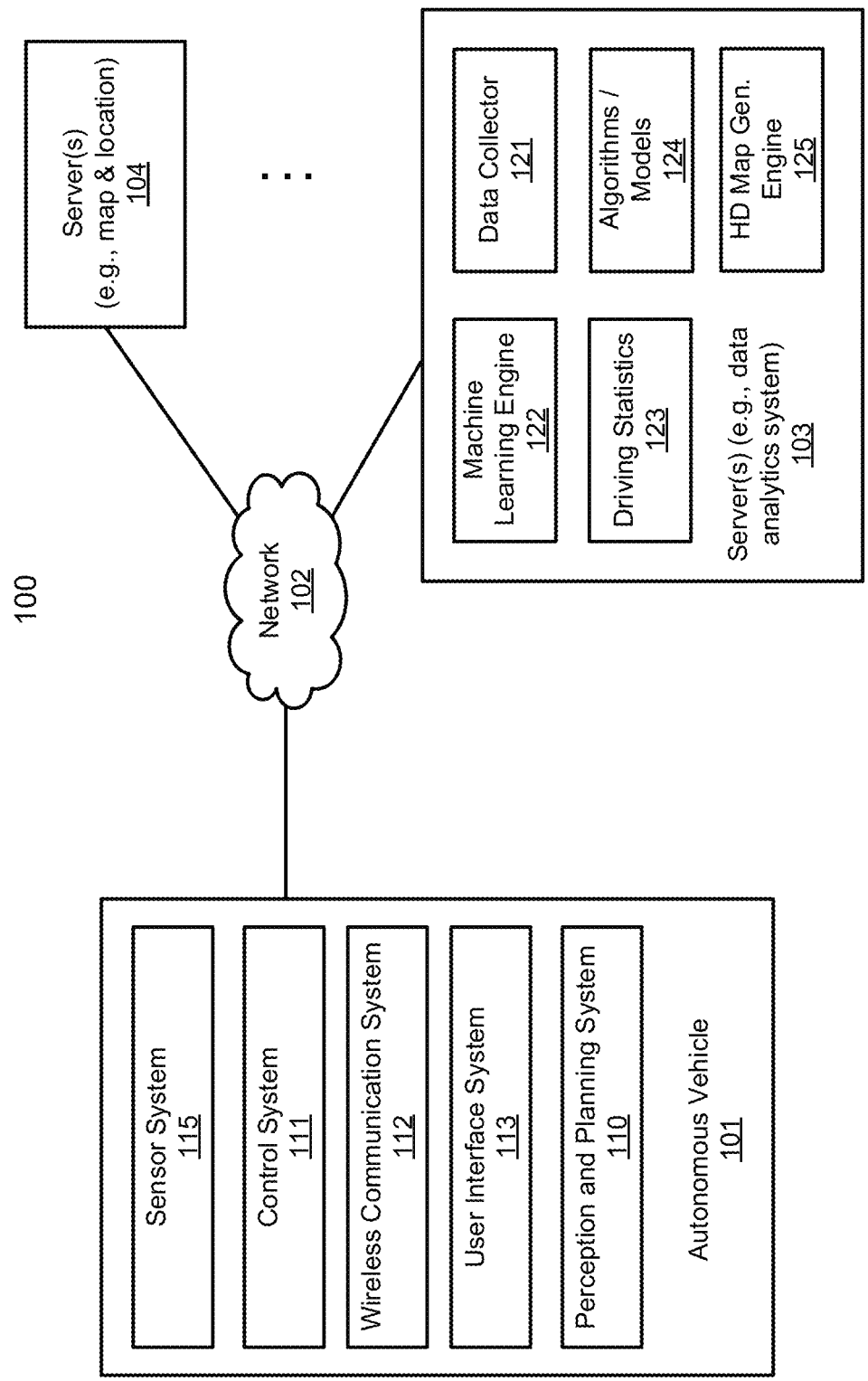
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Reference in the specification to "HD", or "high definition" such as HD map or HD poses refers to maps or poses with a very high precision level. For example, HD maps can have a precision level of centimeters or tens of centimeters.

In order to solve the problems of weak or no GPS signals and a computational complexity for large map areas, a large map area is partitioned into smaller partitions using topology information (e.g., loop closures) of the map area. The computation of each partition can then be separately computed, for example, in parallel, in each node of a computing cluster (e.g., a Hadoop cluster) in order to leverage the computational load of each node to decrease the overall computational complexity. Furthermore, the topology information improves the registration of point clouds with weak or no GPS signals.

According to a first aspect, a system is disclosed for registration of point clouds for autonomous driving vehicles (ADV). The system receives a number of point clouds and corresponding poses from ADVs equipped with LIDAR sensors capturing point clouds of a navigable area to be mapped, where the point clouds correspond to a first coordinate system (e.g., a relative coordinate system with respect to a location of the ADV). The system partitions the point clouds and the corresponding poses into one or more loop partitions based on navigable loop information captured by the point clouds. For each of the loop partitions, the system applies an optimization model to point clouds corresponding to the loop partition to register the point clouds, including transforming the point clouds from the first coordinate system to a second coordinate system (e.g., global or absolute coordinate system such as a UTM coordinate system). They system merges the one or more loop partitions together using a pose graph algorithm, where the merged partitions of point clouds are utilized to perceive a driving environment surrounding the ADV.

According to a second aspect, a system receives a stream of frames of point clouds from one or more LIDAR sensors of an ADV and corresponding poses in real-time. The system extracts segment information for each frame of the stream based on geometric or spatial attributes of points in the frame, where the segment information includes one or more segments of at least a first frame corresponding to a first pose. The system registers the stream of frames based on the segment information. The system generates a first point cloud map for the stream of frames based on the frame registration.

According to a third aspect, a system receives a number of point clouds captured by one or more LIDAR sensors of an ADV and corresponding poses. The system receives a number of RGB (red, blue, and green) images from one or more image capturing sensors of the ADV. The system synchronizes the RGB images with the point clouds to obtain RGB point clouds. The system extracts features from the RGB point clouds, the features including contextual and spatial information of the RGB point clouds. The system registers the RGB point clouds based on the extracted features and generates a point cloud map based on the registration of the RGB point clouds.

According to a fourth aspect, a system identifies a road to be navigated by an ADV, the road being captured by one or more point clouds from one or more LIDAR sensors. The system extracts road marking information of the identified road from the point clouds, the road marking information describing one or more road markings of the identified road. The system partitions the road into one or more road partitions based on the road markings. The system generates a point cloud map based on the road partitions, where the point cloud map is utilized to perceive a driving environment surrounding the ADV.

According to a fifth aspect, a system generates an occupancy grid map based on an initial frame of point clouds. The system receives one or more subsequent frames of the point clouds. For each of the subsequent frames, the system updates an occupancy grid map based on the subsequent frame. The system identifies one or more problematic voxels based on the update, the system determines whether the problematic voxels belong to a wall object, and in response to determining that the problematic voxels belong to a wall object, the system flags the problematic voxels as ghost effect voxels for the subsequent frame.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
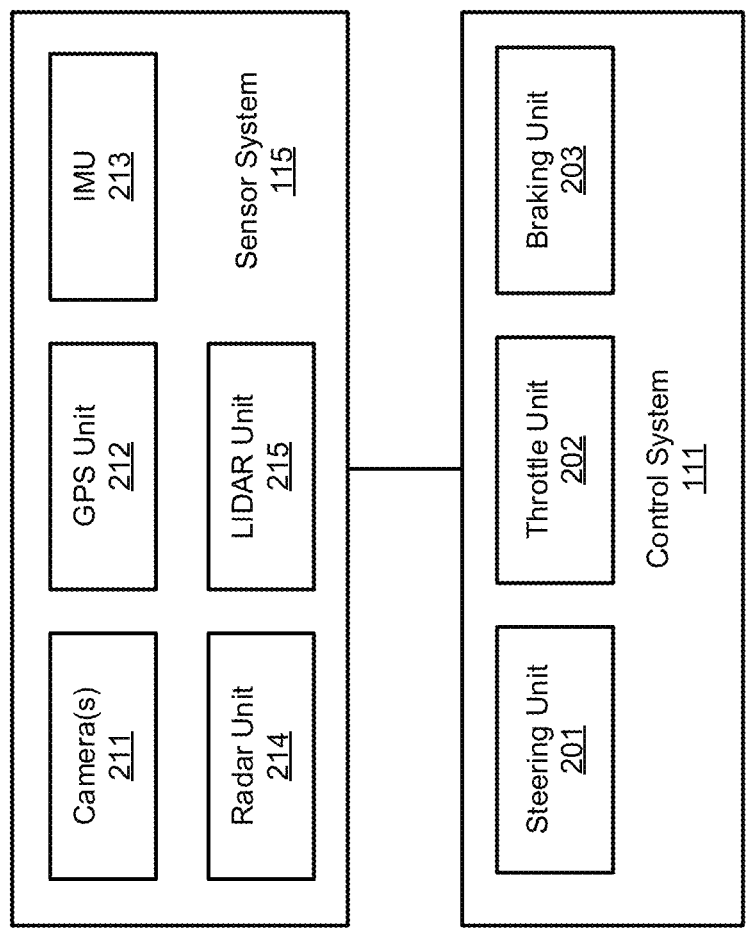
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 may further include point clouds information such as point clouds images captured by LIDAR sensors mounted on the vehicles describing the driving environment, and corresponding poses captured by IMU and GPS sensors describing a position and orientation of the vehicles.

Based on driving statistics 123, machine learning engine 122 generates or trains a set of rules, algorithms, and/or predictive models 124 for a variety of purposes. In one embodiment, algorithms 124 may include bundle adjustment algorithms, alternating direction method of multipliers (ADMM) algorithms, image segmentation algorithms (e.g., edge detection, motion detection, etc.), simultaneous localization and mapping (SLAM) algorithms, deep learning neural network models.

Algorithms 124 may be uploaded on ADVs to be utilized during autonomous driving in real-time or may be utilized by other modules such as HD map generation engine 125 of server 103. In one embodiment, HD map generation engine 125 can register the point clouds collected by the ADVs and generate a HD map based on the registered point clouds. Although HD map generation engine 125 is shown as part of server 103, in some embodiments, engine 125 may be part of server 104.

Figure 3A:
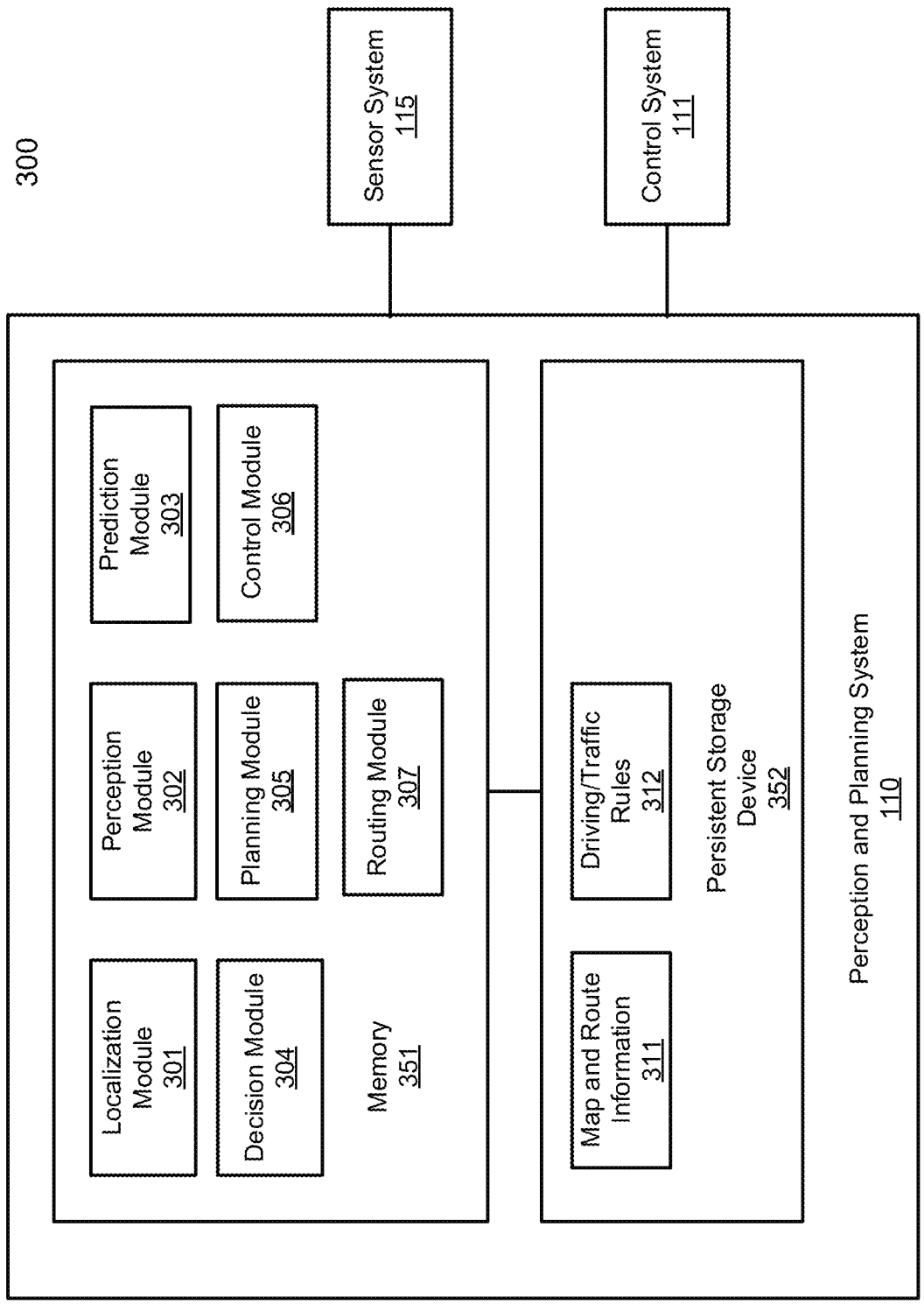
FIGS. 3A-3B are block diagrams illustrating an example of a perception and planning system used with an autonomous vehicle according to one embodiment.
Figure 3B:
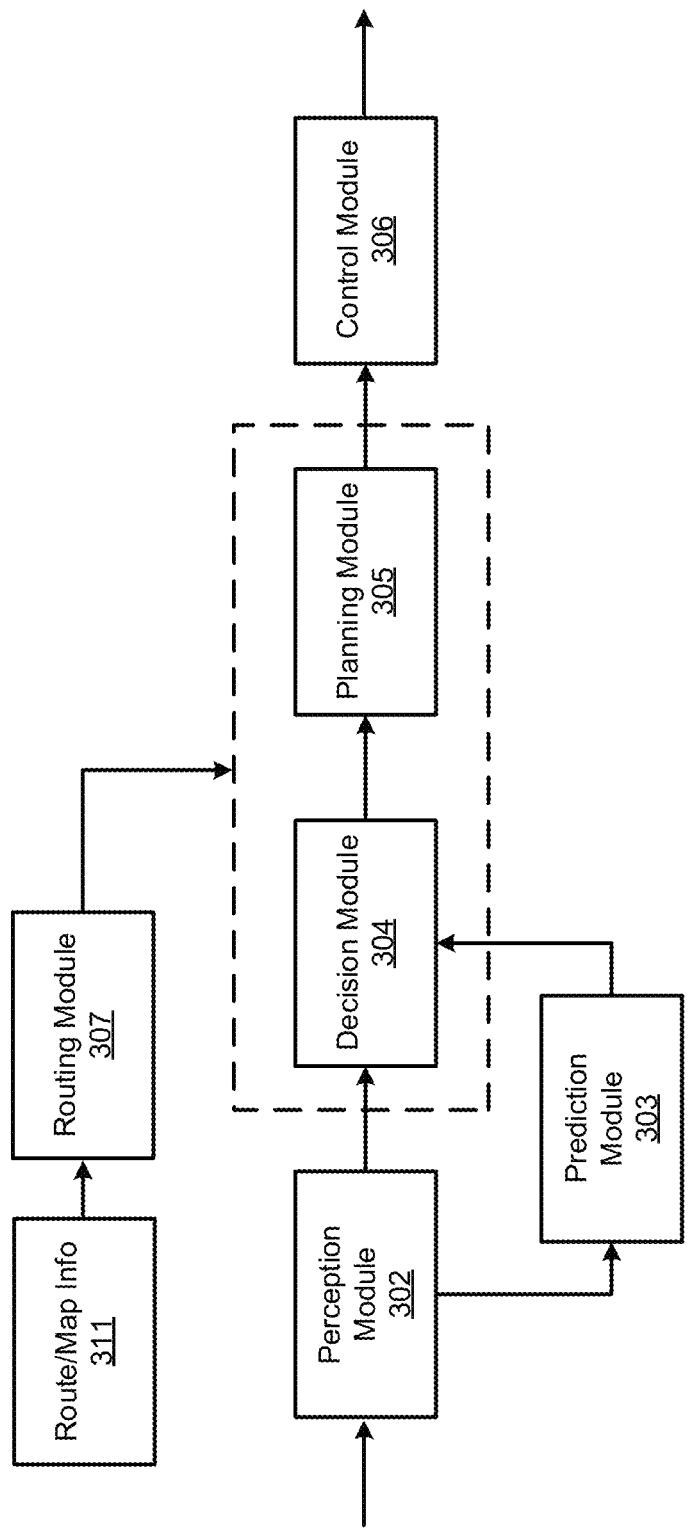

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
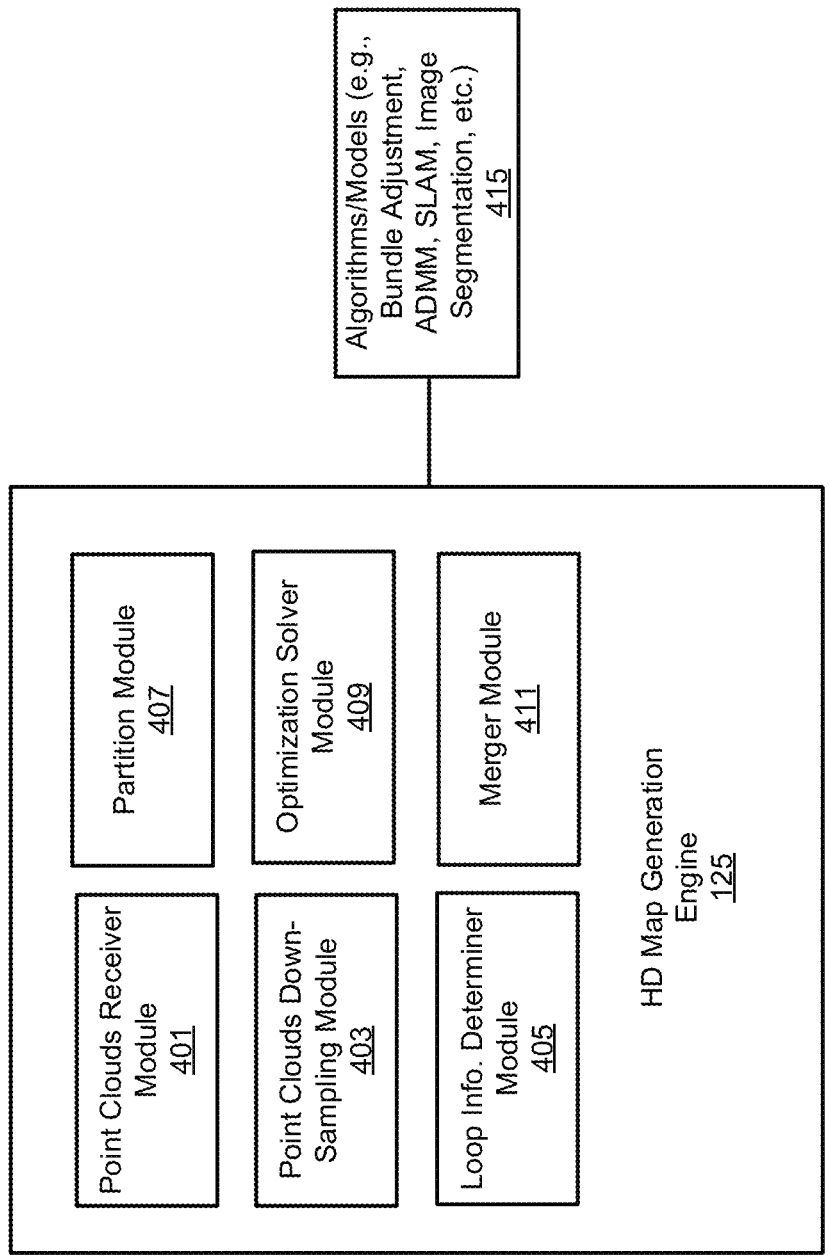
FIG. 4 is a block diagram illustrating an example of an HD map generation engine according to one embodiment.

FIG. 4 is a block diagram illustrating an example of a HD map generation engine according to one embodiment. HD map generation engine can register point clouds and generate an HD map based on the point cloud registration. Referring to FIG. 4, HD map generation engine 125 can include a number of modules such as point clouds receiver module 401, point clouds down-sampling module 403, loop information determiner module 405, partition module 407, optimization solver module 409, merger module 411. Note that some or all of these modules can be integrated into fewer modules or partitioned into more modules.

Point clouds receiver module 401 can receive point clouds (e.g., LIDAR images captured by LIDAR sensors of an ADV) and corresponding poses (e.g., position and orientation). A point cloud refers to a set of data points, in this example, captured by a LIDAR device at a particular point in time. Each data point is associated with location information of the data point (e.g., x, y, and z coordinates). Point clouds down-sampling module 403, which may be optional, can down-sample the point clouds spatially or temporally. Loop information determiner module 405 can determine whether there is a loop closure for a set of point clouds corresponding to a navigable area that forms a geographic loop. Partition module 407 can partition one or more navigable areas into one or more partitions based on the closure information or block partition information. Optimization solver module 409 can apply an optimization algorithm (such as a bundle adjustment or an ADMM algorithm, as part of algorithms 415 of FIG. 4 or algorithms 124 of FIG. 1) to point clouds and poses corresponding to a partition to generate refined HD LIDAR poses. Merger module 411 can merge a number of partitions together for HD map generation. Note, registration refers to alignment of point clouds data for an area to be mapped.

Figure 5:
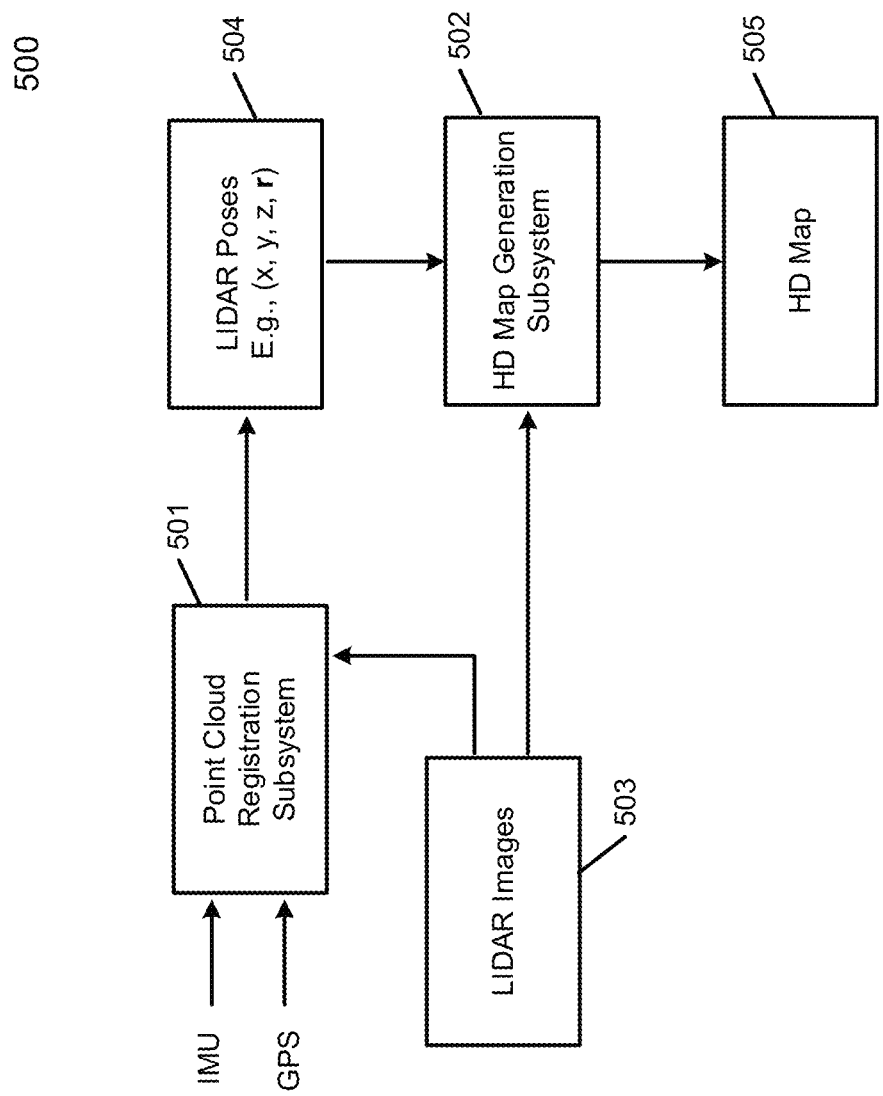
FIG. 5 is a block diagram illustrating an example of an HD map generation system according to one embodiment.

FIG. 5 is a block diagram illustrating an example of an HD map generation system according to one embodiment. HD map generation system 500 illustrates an overview for HD map generation. HD map generation system 500 may be part of HD map generation engine 125 of FIG. 1. Referring to FIG. 5, in one embodiment, HD map generation system 500 includes point cloud registration subsystem 501 and HD map generation subsystem 502. Point cloud registration subsystem 501 can receive an IMU signal, a GPS signal, and LIDAR images 503 (e.g., from IMU 213, GPS unit 212, and LIDAR unit 215 respectively) as inputs and generates HD poses 504 (or aligns the poses for the LIDAR images 503) based on the received inputs. HD map generation subsystem 502 can then receive LIDAR images 503 and HD poses 504 as inputs and generate HD map 505 based on the inputs.

Figure 6:
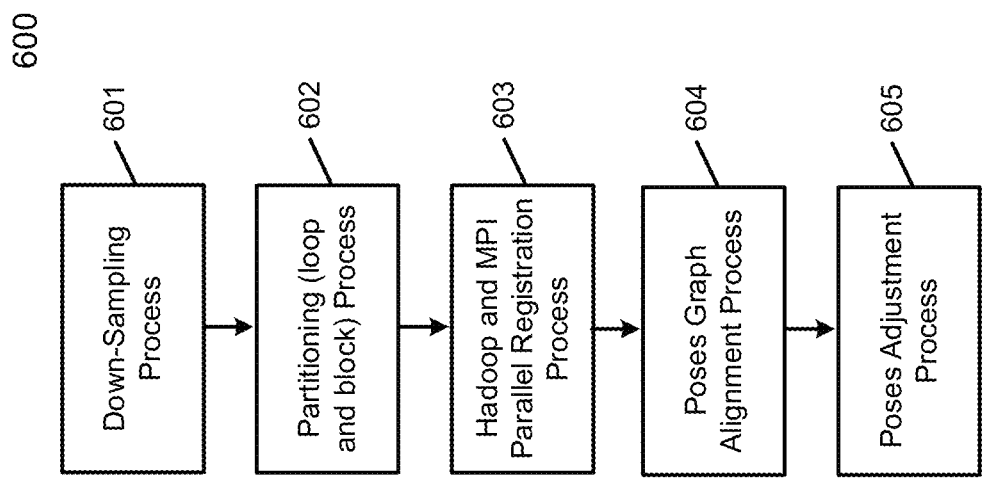
FIG. 6 is a block diagram illustrating an example of a pipeline for an HD map generation system according to one embodiment.

FIG. 6 is a block diagram illustrating an example of a pipeline for a HD map generation system according to one embodiment. Pipeline 600 may be a pipeline for a HD map generation system such as system 500 of FIG. 5 or HD map generation engine such as engine 125 of FIG. 4. Referring to FIG. 6, in one embodiment, pipeline 600 includes, but is not limited to, down-sampling process 601, partitioning process 602, Hadoop and Message Passing Interface (MPI) parallel registration process 603, poses graph alignment process 604, and poses adjustment process 605. Some of these operations 601-605 may be performed by different processing nodes in series, parallel, or in a pipeline manner, which may be distributed by a map generation system. The different processes are described as follow:

The input to the pipeline can be raw point clouds and their poses collected from task scenarios from LIDAR sensors mounted on one or more ADVs. Usually the input contains tens or hundreds of thousands of LIDAR poses to be optimized and aligned. In order to minimize a number of input points for pipeline 600, down-sampling process 601 down samples the poses both spatially and/or temporally in a sequential manner.

In one embodiment, process 601 can down-sample point clouds spatially. For example, process 601 can determine a spatial sliding window. The sliding window can be circular window with a predetermined radius. Process 601 then identifies one LIDAR point cloud and a corresponding pose for all point clouds inside the spatial window for further processing. In another embodiment, process 601 can dispose of the other LIDAR point clouds and their corresponding poses which are not identified for further processing. In one embodiment, the one LIDAR point cloud can be identified based on a spatial region of interest, e.g., a central region of the sliding window.

In another embodiment, process 601 can down-sample point clouds temporally. For example, process 601 can determine a temporal sliding window to track a time sequence (e.g., using timestamps) of LIDAR point clouds for each spatial sliding window. Process 601 can then identify one LIDAR point clouds and its corresponding pose for further processing based on the each time sequence. For example, if there are two time sequences, i.e. two time clusters, process 601 keeps a point cloud and a corresponding pose for each of the two time sequences. Down-sampling the point cloud temporally is especially useful for scenarios when an ADV is idle at a red stop light. In this case, the idle ADV can capture a time sequence of substantially identical LIDAR frames but only one LIDAR point cloud is useful. Thus down-sampling identifies one LIDAR point cloud for further processing for the time sequence instead of the multiple LIDAR point clouds of the time sequence capturing the similar point clouds for the red stop light. Thus, down-sampling would decrease a number of repetitive or similar point clouds data and optimizes the input data for the pipeline. The down-sampled point clouds are then partitioned by process 602.

In one embodiment, partitioning process 602 determines loop closure information based on one or more computer vision algorithms such as edge detection and/or image segmentation algorithms. For example, process 602 can detect features or image edges using a corner detection algorithm. A corner detection algorithm, such as a Harris corner detector, can extract and infer features from a LIDAR image (e.g., a point cloud). Process 602 can then detect and track one or more loops based on a combination of corresponding poses, detected features, and/or a collection of time and velocity information of the vehicle which can predict a location of the vehicle. In another embodiment, road loop closures are identified based on road contours or features of road contours. Process 602 then partitions the point clouds into one or more sets of point clouds based on the loop closure information such that one set of point clouds corresponds to a loop.

In one embodiment, if a detected loop spans an area greater than a predetermined threshold, partition process 602 can apply a spatial partitioning to the loop partition and further divide the loop partition into two or more blocks partition. This way, a computation load of each partition would not exceed a predetermined threshold. In one embodiment, loops are partitioned into blocks of a predetermined spatial area. The partitioned point clouds can then be registered in parallel by a node cluster in Hadoop and Message Passing Interface (MPI) process 603.

Point cloud registration refers to aligning various point clouds to a reference pose or point cloud. For each loop or block partition, to align the point clouds in the partition, the point clouds corresponding to the partition is applied an optimization algorithm to generate HD LIDAR poses for the point clouds. For example, process 603 can apply an iterative closest point (ICP) algorithm to a set of point clouds. Note, ICP is an algorithm employed to minimize the difference between two clouds of points. ICP is often used to reconstruct 2D or 3D surfaces from different scans. For ICP, one point cloud, e.g., a reference, is kept fixed, while the others are transformed to best match the reference. The algorithm iteratively revises a transformation (e.g., translation and rotation) required to minimize an error metric, e.g., a sum of squared differences between the coordinates of the matched pairs, or a distance from the other point clouds to the reference point cloud.

For example, for point cloud i with a corresponding LIDAR pose, the LIDAR pose (x, y, z, (yaw, pitch, and roll)) corresponding to a transformation matrix (e.g., $\mathcal{R}_i = (t_i, R_i)$, where $t_i$ is a translation and $R_i$ is a rotation transformation) can be used to project point cloud i from a relative coordinate system (relative to a vehicle) to a Universal Transverse Mercator (UTM) coordinate system. The projection equation then: $f_{\mathcal{R}_i}(x_k) = R_i x_k + t_i$, where $x_k$ is any point from the set of point cloud i, $t_i$ is a translation, and $R_i$ is a rotation transformation.

For each partition, process 603 can identify related point cloud pairs (or frame pairs) based on point clouds' poses as $\mathfrak{F}$, where the pair $\mathfrak{S}_{(i,j)} \in \mathfrak{F}$ represents the pair of point cloud i and point cloud j. Then the points between two point clouds pair can be defined as: $(x_k, x_l) \in \mathfrak{P}(i,j)$, where $x_k$ is a point from LIDAR point cloud index i, $x_l$ is a point from LIDAR point cloud index j, where $\mathfrak{P}_{(i,j)}$ represents the. A bundle adjustment (BA) equation based on the above, to be optimized, is then as follow:

$$min_{\mathcal{R}_i \in P} \Sigma_{\mathfrak{S}_{(i,j)} \in \mathfrak{F}} \Sigma_{(x_k, x_l) \in \mathfrak{P}_{(i,j)}} \|(f_{\mathcal{R}_i}(x_k) - f_{\mathcal{R}_j}(x_l)) \cdot \vec{n}_i\|(P),$$

where $\vec{n}_i$ is the norm vector at point $x_k$.

The above equation (P) can be solved by an optimization algorithm such as Levenberg Marquardt (LM) algorithm, however, its complexity is around $O(m^3)$ where m is the number of frame pairs. LM algorithm is used to solve non-linear least squares curve-fitting problems by finding a local minimum. In one embodiment, equation (P) can be subdivided into one or more subproblems and these subproblems can be applied an optimization algorithm (such as ADMM algorithm) to be solved separately. In one embodiment, these subproblems are solved in parallel using a node cluster. For example, for a given frame pair $\mathfrak{F}_m \subseteq \mathfrak{F}$, the pose transformation matrix for the ith point cloud for the mth frame pair is $\mathcal{R}_i^m$, where the upper-subscribe represents the index of subset of frame pair m and the lower-subscribe represents the index of point cloud i in the set of point cloud P. Then the bundle adjustment equations based on the parallel pipeline, to be optimized, is then as follow:

$$min_{\mathcal{R}_i \in P} \Sigma_{\mathfrak{S}_{(i,j)} \in \mathfrak{F}_i} \Sigma_{(x_k, x_l) \in \mathfrak{P}_{(i,j)}} \|(f_{\mathcal{R}_i^m}(x_k) - f_{\mathcal{R}_j^m}(x_l)) \cdot \vec{n}_i\|(P_m),$$

where $\mathcal{R} = \mathcal{R}_i, \forall \mathfrak{F} \subseteq \mathfrak{F}$, and $\forall \mathcal{R}_i \in P$.

In this example, the optimization algorithm can be processed by one or more nodes of a node cluster, e.g., each node processes a frame pair. In one embodiment, whether frame pairs are related can be determined based on a timestamp corresponding to the pair of frames, e.g., frame pairs which have consecutive timestamps or are within a time threshold can be related frame pairs. In another embodiment, related frame pairs can be determined based on loop closure information. For example, two frames which have separate timestamps but coincide with a same or similar location can be related frames (e.g., loop closures). In this case, the point clouds for the two frames should be substantially similar or matching. Once the poses are aligned or registered for each partition, the partitions can be merged together by process 604.

In one embodiment, poses graph alignment process 604 can merge the individual partitions into a larger map partition based on a pose graph alignment algorithm, such as a simultaneous localization and mapping (SLAM) algorithm. In one embodiment, overlapping areas for side-by-side partitions are coupled together such that only one set of output is necessary for the overlapping area, e.g., only one set of overlapping routes is necessary if the overlapping area is a route common to both areas.

In one embodiment, poses adjustment process 605 can further refine or adjust the poses to a UTM coordinate system. For example, previously, one pose is assumed as a reference pose to align other poses and point clouds. Process 605 can apply a final pose adjustment to decrease an overall error for mapping to the UTM coordinate system. For example, process 605 analyzes the input LIDAR poses for GPS confidence levels by comparing corresponding poses before and after optimization algorithm is applied. A pose (or poses) identified with the most confidence, e.g., a change between the received pose and the calculated HD pose is below a threshold, are kept for pose adjustment. All the poses are then applied a rigid body transform based on the identified pose. A rigid body transformation is a transformation which preserves a shape and size of the object to be transformed. Here, a rotational or a reflectional transformation is a rigid body transformation, while scaling is not a rigid body transformation. Finally, the point clouds with the adjusted poses are used to generate a high definition (HD) 3D point clouds map. In one embodiment, the 3D point clouds map can be transformed into a 2D localization map with a top-down view.

Figure 7A:
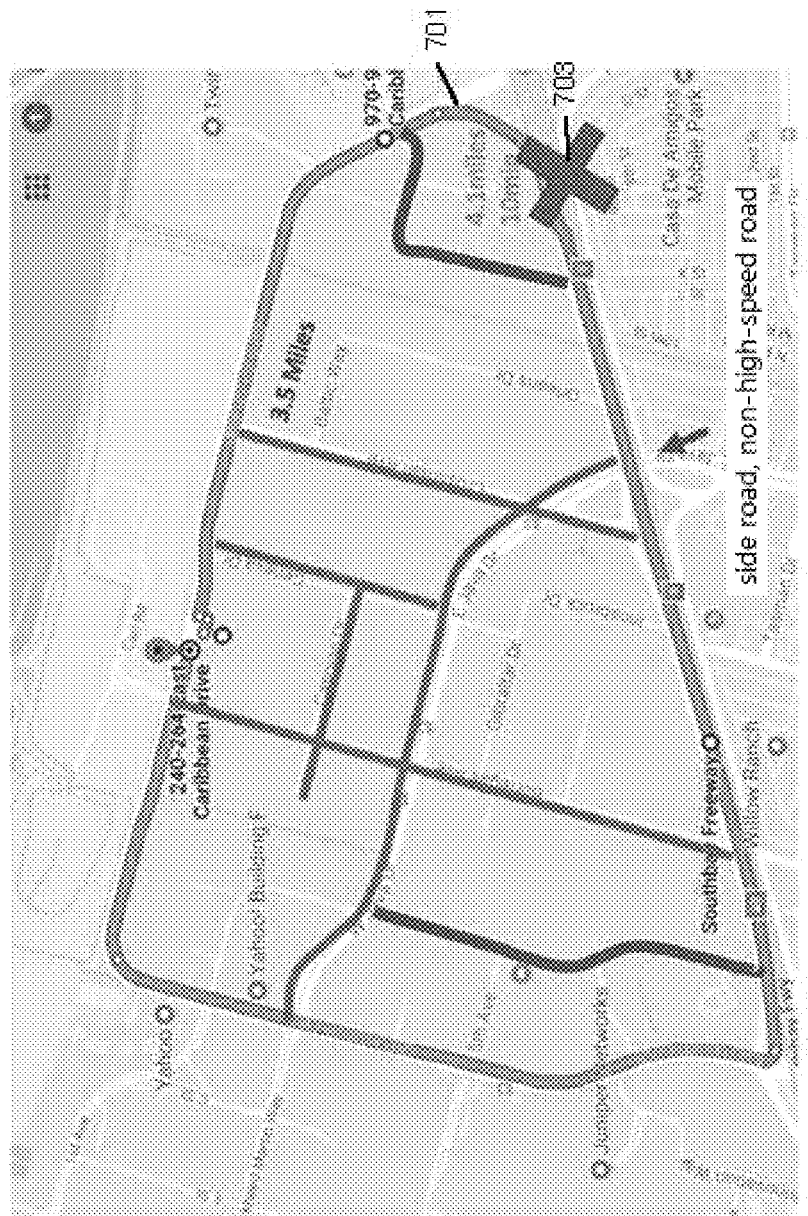
FIG. 7A is a map illustrating a map area with a loop closure according to one embodiment.

FIG. 7A is a map illustrating a map area with a loop closure according to one embodiment. Referring to FIG. 7A, loop closure 701 may be a loop formed by a single roadway (e.g., circle), or a combination of two or more roadway. As illustrated in FIG. 7A, loop closure 701 is a loop formed by a combination of a freeway and a roadway, both of which are navigable roads. In one embodiment, loop closure is a smallest navigable loop. Here, loop closure 701 contains many other road segments running at a length through the loop closure 701. However, loop closure 701 may or may not contain other roadways within the loop closure. In other words, loop closure 701 (which road branch to take) can be identified based on a threshold of computational load that is required to align the poses for the point clouds in the loop closure. In one embodiment, a loop closure is identified based on a threshold of spatial area enclosing the loop closure.

Figure 7B:
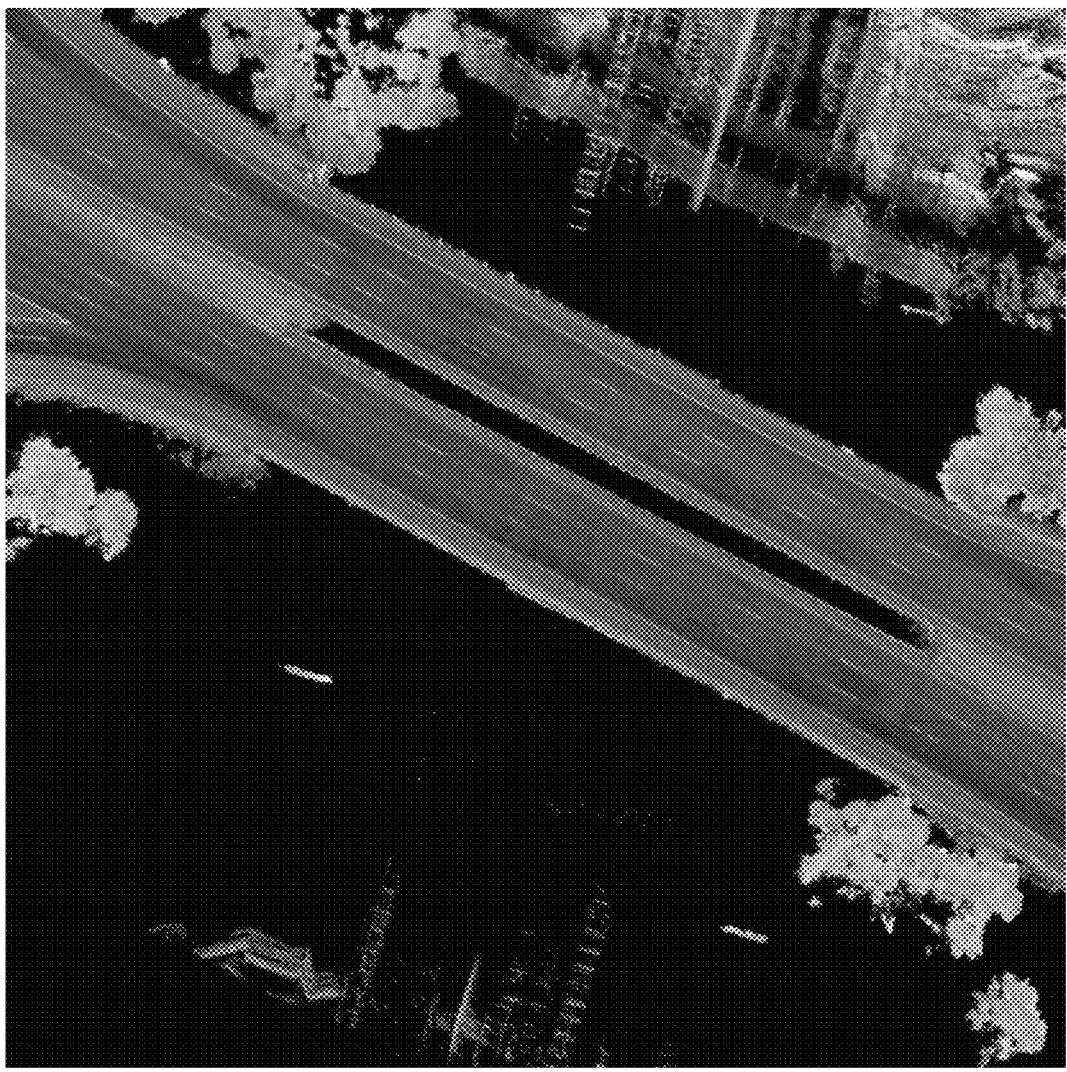
FIG. 7B is an image illustrating a two dimensional top down view of a LIDAR image according to one embodiment.

FIG. 7B is an image illustrating a two dimensional top down view of a LIDAR image according to one embodiment. Referring to FIG. 7B, the 2D top down view may be portions of a localization map generated from a HD 3D point clouds map. Here, the 2D top down LIDAR view of FIG. 7B may correspond to a view of position 703 of FIG. 7A.

Figure 8:
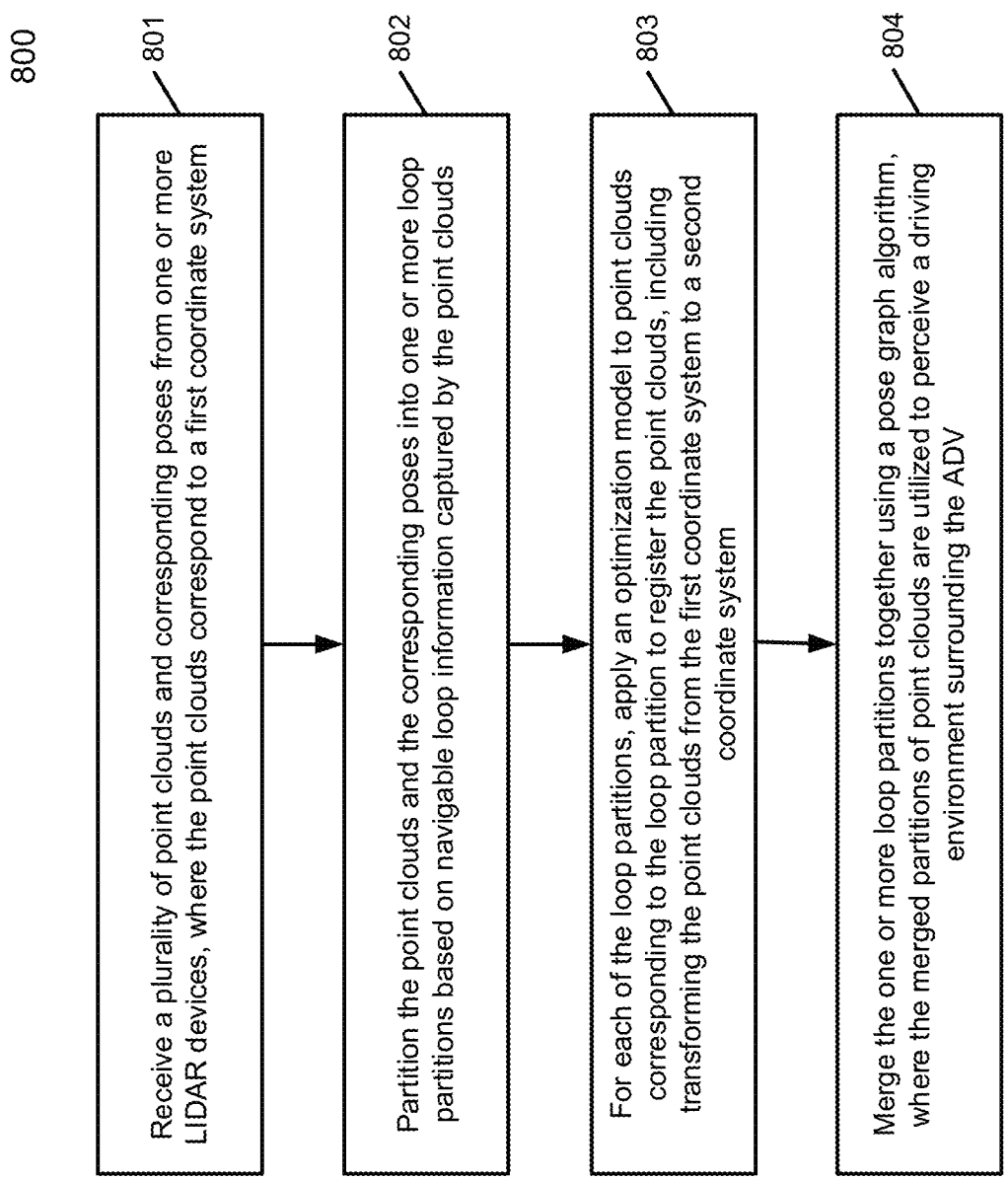
FIG. 8 is a flow diagram illustrating an example of a method according to one embodiment.

FIG. 8 is a flow diagram illustrating an example of a method according to one embodiment. Process 800 may be performed by processing logic which may include software, hardware, or a combination thereof. For example, process 800 may be performed by a map generation engine of an autonomous vehicle, such as HD map generation engine 125 of server 103. Referring to FIG. 8, at block 801, processing logic receives a number of point clouds and corresponding poses from ADVs equipped with LIDAR sensors capturing point clouds of a navigable area to be mapped, where the point clouds correspond to a first coordinate system. At block 802, processing logic partitions the point clouds and the corresponding poses into one or more loop partitions based on navigable loop information captured by the point clouds. At block 803, for each of the loop partitions, processing logic an optimization model to point clouds corresponding to the loop partition to register the point clouds, including transforming the point clouds from the first coordinate system to a second coordinate system. At block 804, processing logic merges the one or more loop partitions together using a pose graph algorithm, where the merged partitions of point clouds are utilized to perceive a driving environment surrounding the ADV.

In one embodiment, the received point clouds are downsampled temporally according to a temporal sliding window and spatially according to a spatial window having a predetermined spatial radius. In another embodiment, the navigable loop information includes loop closure points identifying navigable road loop closures based on road contours.

In one embodiment, if the number of point clouds and corresponding poses for a loop partition spans a spatial area greater than a predetermined spatial area, processing logic partitions the loop partition into a number of block partitions which are smaller than or equal to the predetermined spatial area. In one embodiment, applying the optimization model includes solving an iterative closest point problem to register the point clouds for the loop partition based on a bundle adjustment optimization model includes projecting each of the point clouds and the corresponding poses of the loop partition from a relative coordinate system onto a UTM coordinate system, pairing related frames for the loop partition, and solving an optimization problem for the poses pairs to register the projected point clouds for the loop partition.

In one embodiment, the optimization problem for each loop partition is solved by alternating directional methods of multiples (ADMM) optimization framework in parallel. In another embodiment, merging the partitions together includes merging two or more loop partitions together by identifying overlapping routes for the two or more loop partitions and merging the overlapping routes for the two or more loop partitions.

In one embodiment, processing logic further applies a pose adjustment algorithm to the poses of the merged partitions to minimize a difference between features of the merged partitions. In another embodiment, applying a pose adjustment algorithm includes applying a rigid body transform to the poses of the merged partitions, where the rigid body transform is determined based on a pose with confidence above a threshold.

Figure 9:
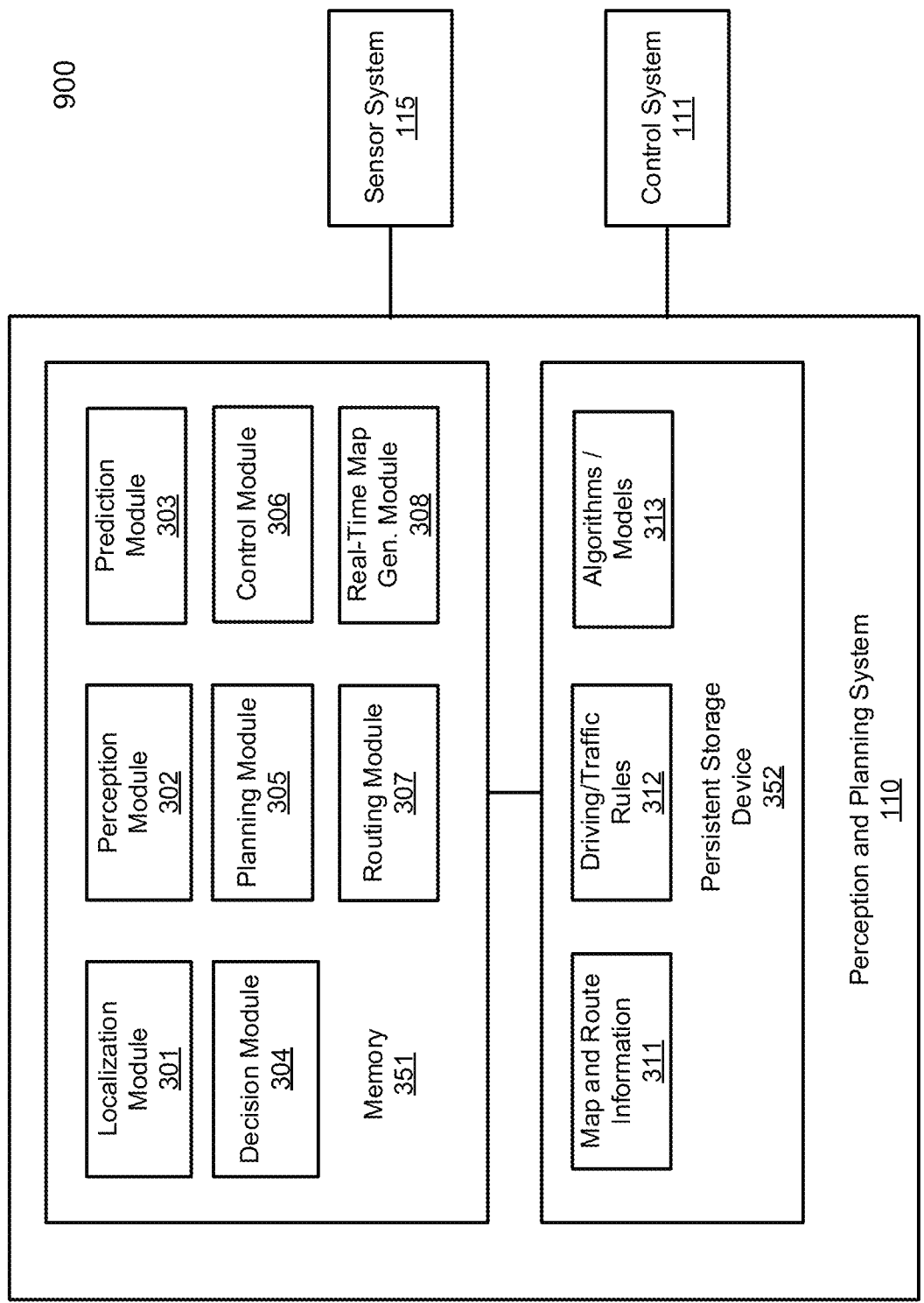
FIG. 9 is a block diagram illustrating an example of a perception and planning system used with an autonomous vehicle according to one embodiment.

FIG. 9 is a block diagram illustrating an example of a perception and planning system used with an autonomous vehicle according to one embodiment. System 900 may be implemented as a part of autonomous vehicle 101 of FIG. 1 including, but is not limited to, perception and planning system 110, control system 111, and sensor system 115. Similar to system 300 of FIG. 3A, perception and planning system 110 of system 900 includes, but is not limited to, localization module 301, perception module 302, prediction module 303, decision module 304, planning module 305, control module 306, and routing module 307. Furthermore, system 900 includes real-time map generation module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Currently, point clouds are received by an ADV in a large number of points from high definition LIDAR sensors mounted on an ADV. There are technical problems that the large number of points leads to heavy computation and memory costs. Furthermore, high definition LIDAR sensors may observe objects partially due to a limited field of view or objects in view may be blocked by other objects in different LIDAR frames. Moreover, techniques such as SLAM may cause SLAM drift in an estimated HD pose overtime. Technical solutions for some embodiments lessen the computation and memory costs and to reduce SLAM drift.

Figure 10:
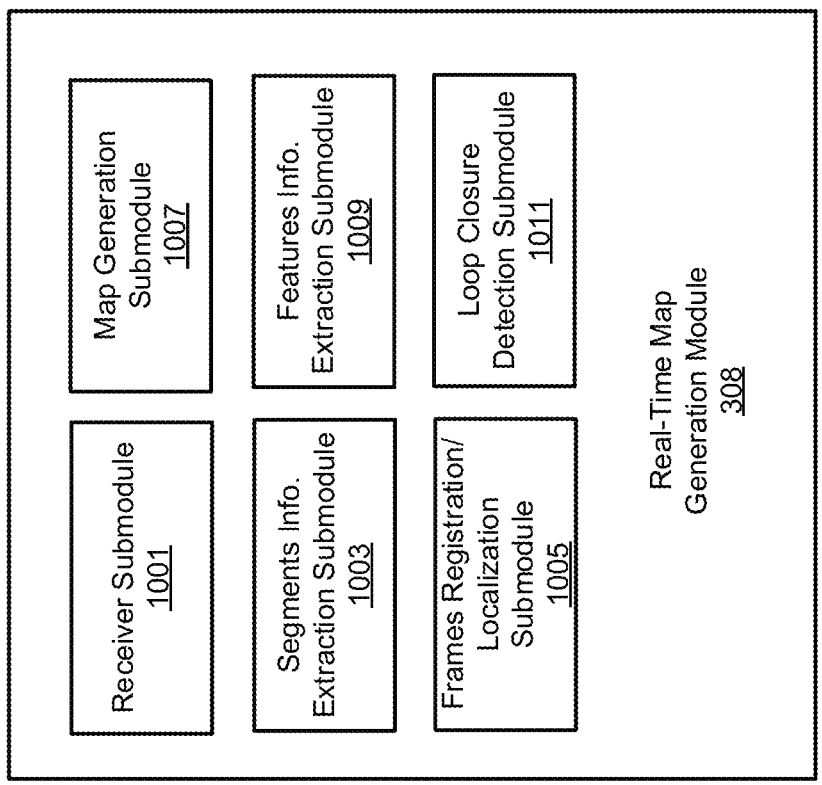
FIG. 10 is a block diagram illustrating an example of a real-time HD map generation module according to one embodiment.

FIG. 10 is a block diagram illustrating an example of a real-time HD map generation module according to one embodiment. Real-time HD map generation module can register point clouds and generate an HD map based on the point clouds registration in real-time. Referring to FIG. 10, in one embodiment, real-time HD map generation module 308 can include a number of submodules, such as receiver submodule 1001, segments information extraction submodule 1003, frames registration/localization submodule 1005, map generation submodule 1007, features information extraction submodule 1009, and loop closure detection submodule 1011. Receiver submodule 1001 can receive a stream of LIDAR image frames (e.g., a stream of point clouds frames) from one or more LIDAR sensors of an ADV. Submodule 1001 can also receive poses information from IMU and GPS units equipped by the ADV. Segments information extraction submodule 1003 can extract one or more segments from each LIDAR image frame. Frames registration/localization submodule 1005 can register or localize the frames based on the segments information. Map generation submodule 1007 can generation a HD 3D point clouds map based on the frame registration. Features information extraction submodule 1009 can extract features from each extracted segment. Loop closure detection submodule 1011 can detect a loop closure based on the extracted features. Note that some or all of these modules may be integrated into fewer modules or segmented into more modules dependent upon particular configurations as needed.

Figure 11:
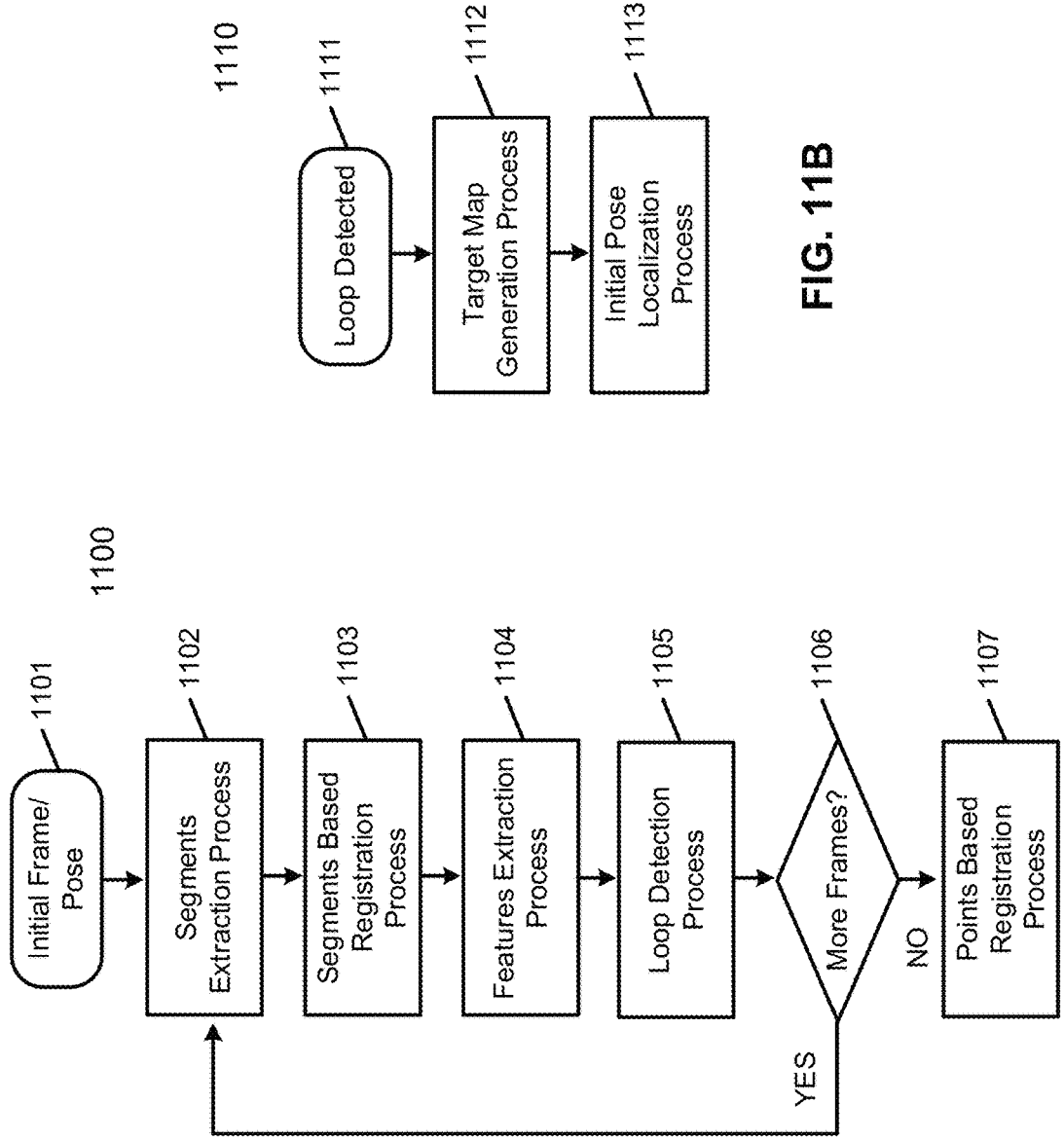
FIG. 11A is a flow chart illustrating an example of a real-time HD map generation pipeline according to one embodiment.
FIG. 11B is a flow chart illustrating an example of a loop closure localization according to one embodiment.

FIG. 11A is a flow chart illustrating an example of a real-time HD map generation pipeline according to one embodiment. Pipeline 1100 may be a pipeline executed by a real-time map generation module such as module 308 of FIG. 10. Referring to FIG. 11A, in one embodiment, pipeline 1100 includes, but is not limited to, segments extraction process 1102, segments based registration process 1103, features extraction process 1104, loop detection process 1105, and points based registration process 1107.

Referring to FIG. 11A, in one embodiment, pipeline 1100 receives initial frame 1101 (e.g., a first LIDAR point cloud frame) from a LIDAR sensor of an ADV. Segments extraction process 1102 then extracts segments from the received frame. Note, segments refer to clusters of point clouds, super points, or salient image regions (or voxels), i.e., regions corresponding to individual surfaces, objects, contour, or natural parts of objects. These segments or super point objects may be extracted using structural information of objects detected in the frame. In one embodiment, the segments are categorized into segment types. Example segments or objects types may be cylindrical objects, planar patch objects, or any geometrically identifiable objects that may have peculiar geometric and spatial attributes. Point clouds characteristics can be used for segment extraction, such as intensity, texture, or proximity of objects represented by the point clouds. Segments extraction process may apply a number of algorithms (as part of algorithms/models 313 of FIG. 9) to the point clouds to extract the segments. For example, segments extraction process may apply an image segmentation algorithm, such as an edge detection, dual clustering, region growth, or watershed transformation algorithm, etc. to extract segments from the LIDAR frame.

Based on the extracted segments, segment based registration process 1103 utilizes a limited set of points from each segment type of the frame and applies an optimization algorithm such as ICP (as part of algorithms/models 313 of FIG. 9) to find matches from the same segment types from the previous immediate frame in the buffer. If initial frame is the only frame, e.g., the first frame, the initial frame can be established as the reference frame and the corresponding pose for the initial frame can be a reference pose.

In one embodiment, features extraction process 1104 extracts features or features representations from each segment of the current frame, and loop detection process 1105 compares the extracted features to features of previous frames. Features extraction is a dimensionality reduction process, where an initial set segment is reduced to a group of features for processing, while still accurately and completely describing the original segments. Examples of features include smoothness, linearity, and continuity of points for a segment (e.g., patterns). If the comparison provides a number of matching features above a predetermined threshold (e.g., quantity or percentage), then a loop closure is detected. Here, features are compared instead of segments because objects may be blocked or partially visible in a current field of view, different from a previous field of view. In one embodiment, features include eigenvalue based features. Eigen value based features can include linearity, planarity, scattering, omnivariance (e.g., characteristics of a volumetric point distribution), etc. features.

In one embodiment, extracted segments can be stored in a target map, the segments or segments information can be used to extract features for the segments. In another embodiment, process 1105 can apply a machine learning algorithm (as part of algorithms/models 313 of FIG. 9), such as nearest neighbor search, an unsupervised machine learning algorithm, to determine if two segments match. If there is a match then the segments are candidate segments pairs. Based on the candidate segments pairs, a geometric consistency estimation algorithm can be applied to determine transformations (e.g., transformation matrices) between the segments.

Figure 12:
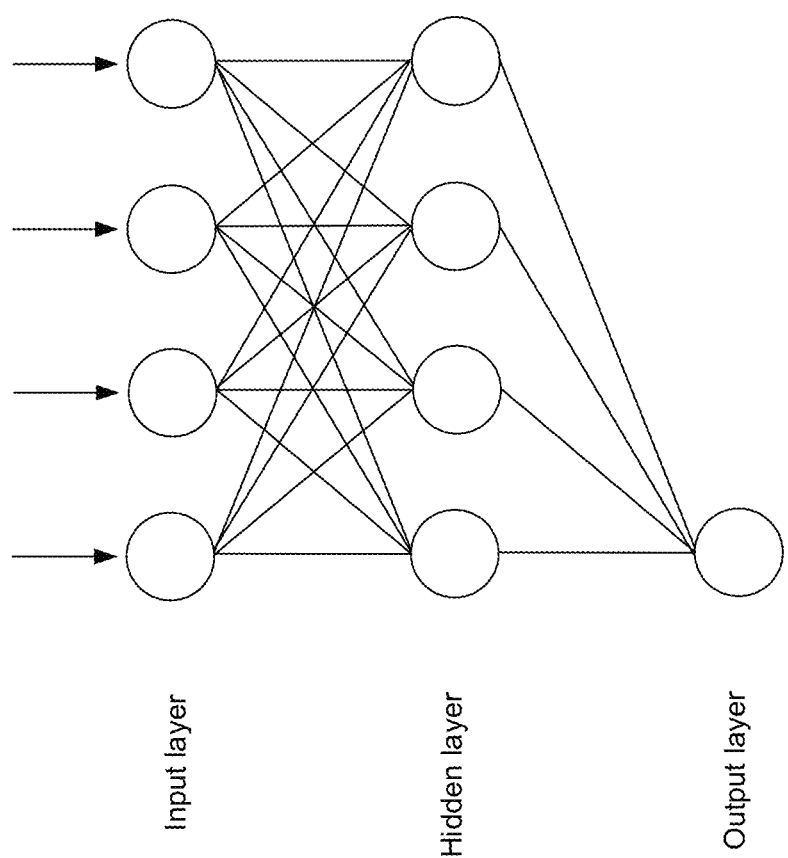
FIG. 12 illustrates an example of a multi-layer perceptron according to one embodiment.

The transformation matrices can then be used to verify a certainty of the detected loop closure. In another embodiment, a machine learning model (e.g., a deep learning neural network) can be used to determine if features match for among the current frame and any previously received frames. An example deep learning neural network can be multi-layer perceptron (MLP) 1200 of FIG. 12 which includes three layers. An input layer receiving the extracted features from a current frame and a previous frame, a hidden layer connected each of the inputs to an output layer, and the output layer with a probability output indicator indicating a probability the segments match. Although MLP 1200 of FIG. 12 only illustrates 4 input nodes and 4 hidden nodes in the input and hidden layers respectively, any number of nodes can be implemented.

Note, the machine learning model may include, but is not limited to, neural networks (fully connected, partially connected, or a combination thereof), support vector machines (SVM), linear regression, k-nearest neighbors, naive bayes, k-means, and random forest models. A neural network is a machine learning model which can learn to perform tasks by considering examples (e.g., training with input/output scenarios), without being programmed with any task-specific rules. A neural network is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and may not share any connections with other neurons of the layer. A neural network is self-learning and trained, rather than explicitly programmed.

Referring to FIG. 11A, process 1106 determines if there are additional frames to be processed for the stream, if yes then process 1106 branches to process 1102, else process 1106 enters process 1107. Process 1107 applies a traditional ICP algorithm based on the point clouds of consecutive frames in the stream to perform point clouds registration for the stream of frames. Here, initially, process 1102-1105 can be iteratively applied to the frames of the stream, on a frame-to-frame basis.

FIG. 11B is a flow chart illustrating an example of a loop closure localization according to one embodiment. Operations 1110 can be performed by loop detection process 1105 of FIG. 11A. Referring to FIG. 11B, when a loop closure is detected 1111, target map or segments map generation process 1112 can generate a target map based on previously extract segments for the frames of the loop. Segments map or target map can be a database, a struct or, a class object storing a list of segments of the frames. The segments can be stored as a number of points corresponding to the segments. FIG. 13 illustrates an example of a target map according to one embodiment. Referring back to FIG. 11B, based on the target map and previous registration results performed by process 1104 of FIG. 11A, process 1113 updates the initial pose by searching a best candidate pose for the initial pose. In one embodiment, based on the updated initial pose, process 1113 applies an iterative method to the initial pose and the registration results to determine a transformation to be further applied to the registration results to reduce a drift caused by SLAM. In this case, the SLAM drift can be reduced because the loop closure provides a second indication for the position and orientation of the initial pose. An example iterative method can be random sample consensus (RANSAC). RANSAC is an iterative method to fit a model from a set of observed data that contains outlier data points, when outlier data points should be accorded no influence on the model to be fitted. Once, the points clouds are registered, an HD point clouds map can be generated using the registration results.

Figure 14:
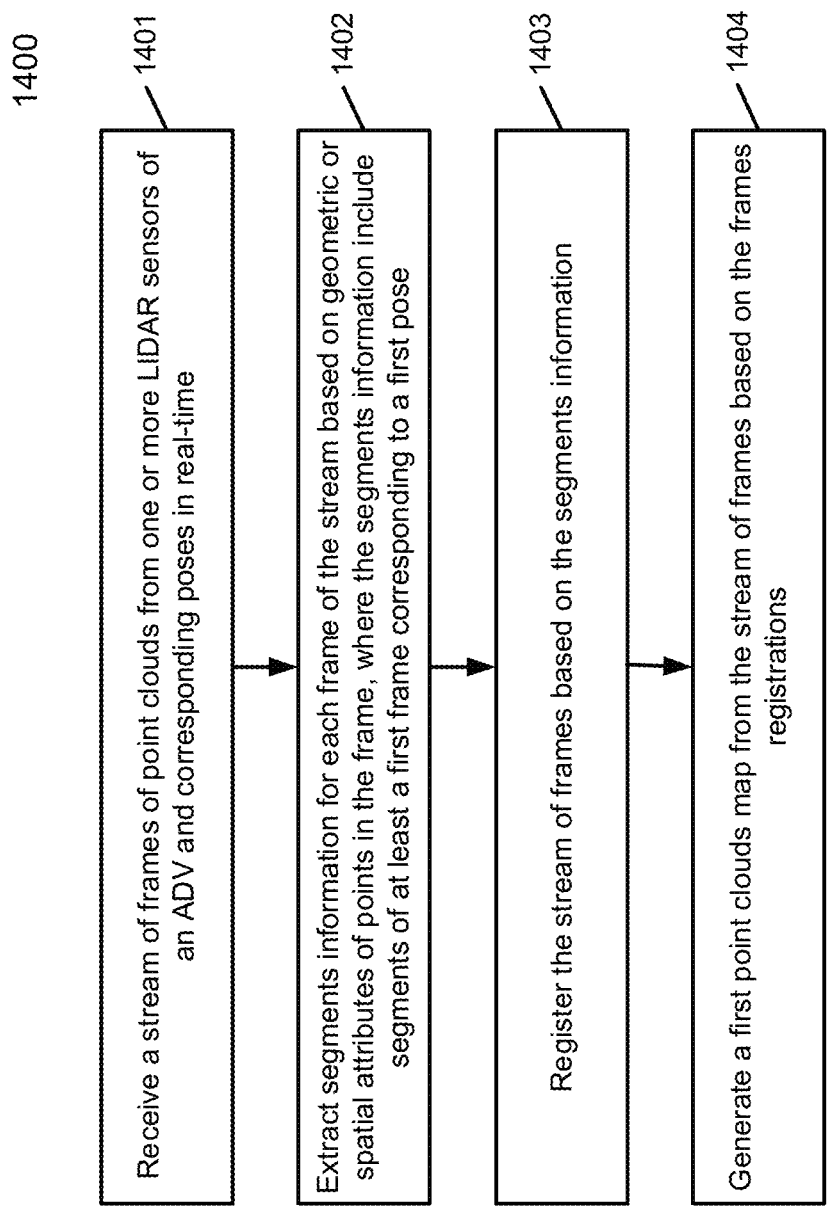
FIG. 14 is a flow diagram illustrating an example of a method according to one embodiment.

FIG. 14 is a flow diagram illustrating an example of a method according to one embodiment. Process 1400 may be performed by processing logic which may include software, hardware, or a combination thereof. For example, process 1400 may be performed by a map generation module of an autonomous vehicle, such as real-time map generation module 308 of FIG. 9. Referring to FIG. 14, at block 1401, processing logic receives a stream of frames of point clouds from one or more LIDAR sensors of an ADV and corresponding poses at real-time. At block 1402, processing logic extracts segment information for each frame of the stream based on geometric or spatial attributes of points in the frame, where the segment information includes one or more segments of at least a first frame corresponding to a first pose. At block 1403, processing logic registers the stream of frames based on the segment information. At block 1404, processing logic generates a first point cloud map from the stream of frames based on the frame registration.

In one embodiment, processing logic further extracts one or more features from each segment of each frame, including features from the first and a second frames. Processing logic detects a loop closure between the first and the second frames based on the extracted features of the first and the second frames. In response to detecting the loop closure between the first and second segments, processing logic localizes the second frame based on the frame registration, and updates the first pose based on the localization and the frame registration to generate a second point cloud map.

In another embodiment, detecting the loop closure between the first and the second frames includes applying an unsupervised machine learning algorithm to the features of the segments of the first and the second frames to determine if the two segments matches. In another embodiment, detecting the loop closure between the first and the second frames further includes applying a RANSAC algorithm to the first and the second frames to determine if the two segments match. In another embodiment, the unsupervised machine learning algorithm includes a nearest neighbor search.

In another embodiment, the features are extracted from each segment of each frame on a frame-to-frame basis, at real-time and the second frame includes a current frame. In another embodiment, the stream of frames is registered on a frame-by-frame basis, at real-time.

In one embodiment, extracting segment information for a frame includes applying an image segmentation algorithm to the frame to extract one or more segments for the frame and generating a segment map to store the one or more segments for the frame. In one embodiment, the segment information includes one or more segments of cylinder objects, one or more planar patch objects, or one or more smooth surface objects.

In one embodiment, registering the stream of frames based on the segment information includes identifying a number of segments of a previous and a subsequent frames based on the segment information, identifying a number of points corresponding to the number of segments, and applying an iterative closest point (ICP) algorithm to the number of points to minimize a distance between closest points of the number of points for the frame registration.

In one embodiment, processing logic further applies an iterative closest point (ICP) algorithm to points of each frame in the stream to register the stream of frames. In one embodiment, the features include information for linearity, planarity, scattering, and/or omnivariance of the segments. In one embodiment, the features include one or more eigen-based features.

Figure 15:
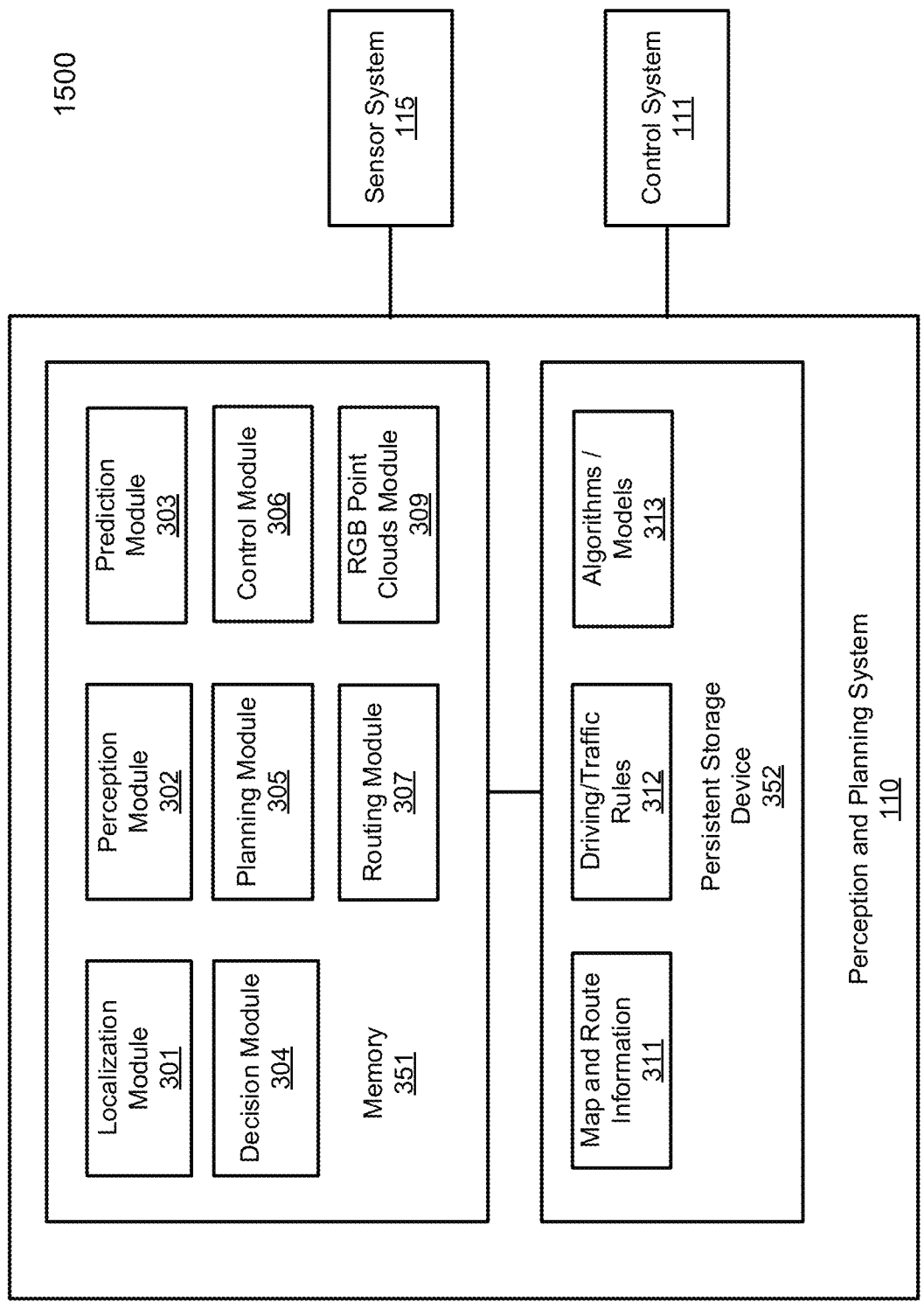
FIG. 15 is a block diagram illustrating an example of a perception and planning system used with an autonomous driving vehicle according to one embodiment.

FIG. 15 is a block diagram illustrating an example of a perception and planning system used with an autonomous vehicle according to one embodiment. System 1500 may be implemented as a part of autonomous vehicle 101 of FIG. 1 including, but is not limited to, perception and planning system 110, control system 111, and sensor system 115. Similar to system 300 of FIG. 3A, perception and planning system 110 of system 1500 includes, but is not limited to, localization module 301, perception module 302, prediction module 303, decision module 304, planning module 305, control module 306, and routing module 307. Furthermore, system 1500 includes RGB point clouds module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Approaches to use RGB images captured by image devices of an ADV together with point clouds add additional information (e.g., colors) to the point clouds. For example, RGB images can observe contextual information and color information of environments which may not be captured by LIDAR sensors. Thus, integrating RGB images with point clouds images can improve map generation accuracy especially for environments which are challenging to distinguish solely based on LIDAR point clouds images such as roads with bushes (e.g., spatial features which may not be distinguishable with LIDAR images).

Figure 16:
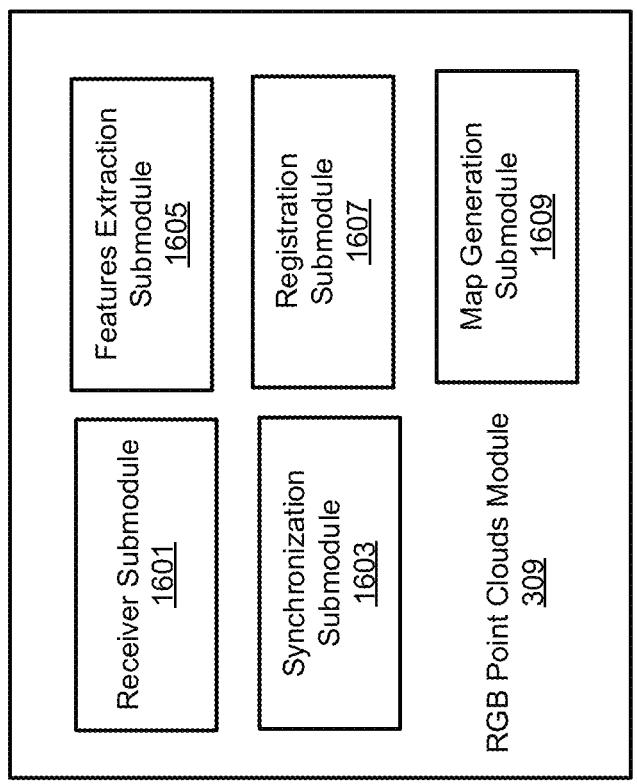
FIG. 16 is a block diagram illustrating an example of an RGB point cloud module according to one embodiment.

FIG. 16 is a block diagram illustrating an example of a RGB point clouds module according to one embodiment. An RGB point clouds module can integrate/synchronize RGB images with point clouds images to generate RGB/point clouds features for feature based HD map generation. Referring to FIG. 16, in one embodiment, RGB point clouds module 309 can include a number of submodules, such as receiver submodule 1601, synchronization submodule 1603, features extraction submodule 1605, registration submodule 1607, and map generation submodule 1607. Receiver submodule 1601 can receive a number of LIDAR point clouds images or frames from one or more LIDAR sensors of an ADV. Receiver submodule can also receive a number of RGB images or frames from image capturing devices mounted on the ADV. Synchronization submodule 1603 can synchronize the point clouds with the RGB images based a timestamp when these images are captured.

Features extraction submodule 1605 can extract a features vector from the RGB cloud points. Features vectors can include features of both RGB images and cloud points for a frame. Registration module can register the point clouds based on the RGB/point clouds features. In another embodiment, registration submodule 1605 can register the point clouds using an optimization algorithm having RGB information integrated with point clouds into the cost function of the optimization algorithm. Map generation submodule 1607 can generate a map based on these registrations. Although it is shown, RGB point clouds module 309 is part of perception and planning system 110 of an ADV, RGB point clouds module 309 can be part of and/or integrated with HD map generation engine 125 of server 103 of FIG. 1. Note that some or all of these modules can be integrated into fewer modules or segmented into more modules dependent upon particular applications.

Since the images captured by an image capturing device (e.g., camera(s)) may be at a frequency different than a frequency of the LIDAR sensor capturing frequency, a first operation is to synchronize an RGB images with an appropriate point clouds. Synchronization may include a physical synchronization. A physical synchronization can include setting up camera sensors at a physical location to capture a same or substantially similar to a perspective view of a LIDAR sensor unit to be synced, for example, a panorama camera setup (e.g., made up of multiples of cameras) may be mounted on a spinning LIDAR sensors unit so the camera can capture RGB images having a view corresponding to the LIDAR sensors unit.

For a flash LIDAR sensor, similarly, a perspective view camera may be mounted near the flash LIDAR unit to capture RGB images with a perspective view corresponding to a view of the flash LIDAR sensor unit. In another embodiment, the LIDAR sensors unit and the camera setup is calibrated offline. In another embodiment, synchronization may include a temporal synchronization using timestamps, e.g., matching RGB frames to the correct point clouds. For example, a timestamp provided by a time information provider can be associated to the image frame at a time when the LIDAR unit captures the image frame. In one embodiment, the timestamp has a millisecond accuracy threshold.

Similarly, the camera unit can capture image frames and a time information provider can timestamp the image frame with a capture time. The time information provider may be shared between the LIDAR and the image capturing devices. In one embodiment, the time provider is a local real-time clock (RTC) provided by a CPU of the computing system. In another embodiment, the time provider is periodically synced to an external source such as an atomic clock from a time server over a network. In another embodiment, the time provider is synced to a GPS signal.

Because point clouds and RGB are each associated with a timestamp, point clouds and RGB images received at different frequencies can be aligned. For example, if point clouds are captured at 5-20 Hertz, and RGB images are captured at about 60 Hertz, each point clouds frame can be associated with a RGB image based on their timestamps. In this example, each point cloud can be associated with at least one RGB image by identifying the RGB image having a closest timestamp to a timestamp of the point cloud image. The RGB images with no associations would not be considered for integration/synchronization with the point clouds and can be discarded. In one embodiment, any RGB image can be associated with a point cloud so long as the RGB image timestamp is within a time threshold of the corresponding point cloud image. In another embodiment, if the RGB images capturing frequency is lower than the corresponding capturing frequency of the point clouds, a few point cloud frames of the received point clouds frames may not be synchronized with a RGB image. In this case, the RGB point clouds should be backward compatible, i.e., features extractions would not be effected, but only that RGB information would not be considered for the features extraction. In another embodiment, the image capturing device's RGB image capturing frequency may be adjusted to capture images at a similar frequency as the LIDAR sensor unit.

Figure 17:
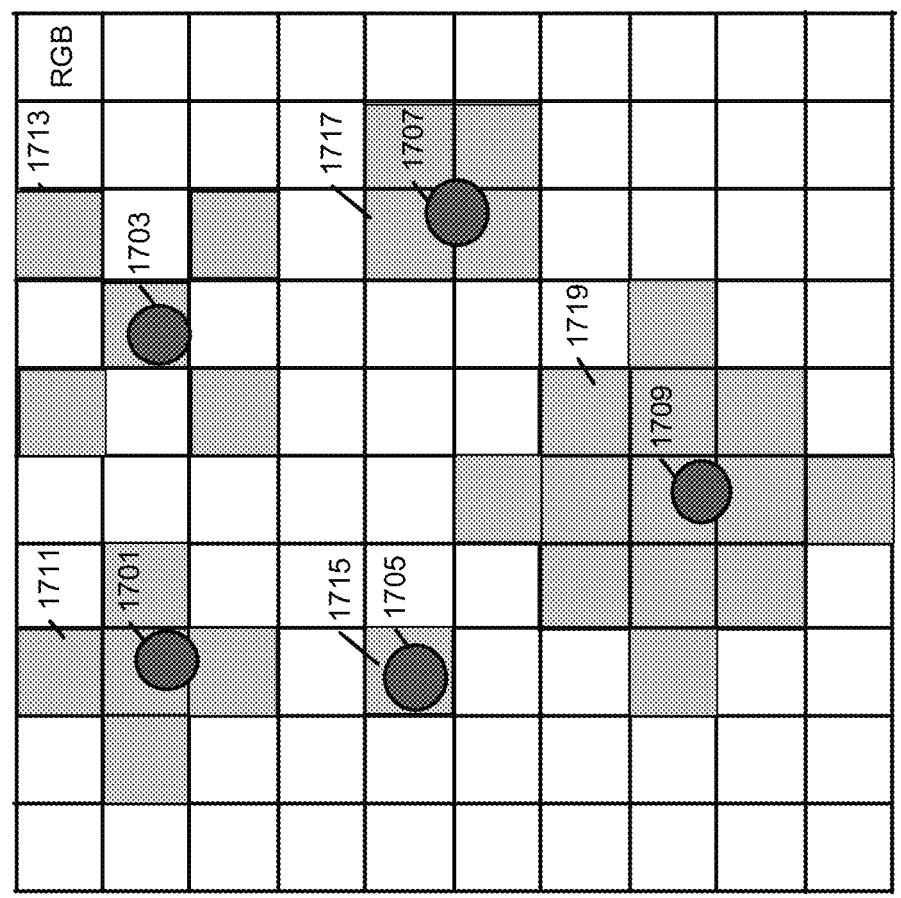
FIG. 17 is a block diagram illustrating examples of RGB point cloud synchronization methods according to some embodiments.

Once an RGB image frame and a point cloud frame are synchronized, individual points of a LIDAR frame is to be synchronized to one or more pixels from the RGB image. FIG. 17 is a block diagram illustrating examples of RGB point clouds synchronizations according to some embodiments. Referring to FIG. 17, diagram 1700 shows a number of point clouds (1701-1709) superimposed on a RGB image having a number of pixels. Depending on the resolution (or density of pixels) of the RGB image compared with the LIDAR image, a point of the point clouds may be mapped to a single RGB pixel or to a cluster of RGB pixels based on a spatial proximity. For example, depending on the RGB color features, point 1701 may be mapped to pixels 1711 (a star shape), or point 1703 may be mapped to pixels 1713 (a quincunx shape). In another example, point 1705 may be mapped to a single pixel 1715, or point 1707 may be mapped to pixels 1717 (a square shape), or any shape of pixels 1719, according to a difference of resolution between the point clouds and the RGB image.

In one embodiment, for RGB pixels that can be associated with points of a point cloud, a features extraction submodule, such as features extraction submodule 1605 of FIG. 16, can extract features representing contextual and locality information from the RGB pixels, while information depicting the spatial distribution and geometric characteristics can be extracted from the underlying point clouds. Similar to the above, features can be extracted by a number of algorithms, such as a. An example of a spatial distribution includes a probability distribution for each of the 3D features. These two types of features can then be concatenated to generate a features vector for the RGB point clouds. Examples of contextual features include at least color pattern and complexity of these color patterns so that two objects, from one LIDAR frame to a next LIDAR frame, with a same context would have a high probability indicating relatedness of these objects (e.g., they are the same object from two different frames). Examples of locality information include at least proximity information of neighboring points. For example, one feature (e.g., edge) would be considered different from another extracted feature (e.g., another edge) if they are separated by a large distance.

In one embodiment, a feature based registration can be performed on the point clouds using the generated features vector. For example, an ICP algorithm with a RGB cost component is applied to a subset of the RGB point clouds (e.g., of the features vector) to optimize the RGB point clouds for candidate point matches to generate HD poses for the point clouds. Using the feature based registration results, a point clouds map can be generated. In another embodiment, a heuristic algorithm (as part of algorithms/models 313 of FIG. 15) such as RANSAC algorithm can be applied to the feature for a feature based registration. Here, the RANSAC algorithm can register the point clouds even when there are a large number of outlier features (e.g., features that don't have a match pair for registration).

In another embodiment, a second RGB point based registration can be performed on the RGB point clouds. Here, an ICP algorithm with a RGB cost component is applied to all the RGB point clouds to optimize the point clouds for candidate point matches to generate HD poses. For example, a cost component can incorporate an average value of the RGB color information for the pixels to be minimized. In another embodiment, the optimization can be performed on the RGB point clouds having four channels (R, G, B, and depth) of information (e.g., three channels are RGB components). Then, using the RGB points based registration results, a point clouds map can be generated.

Figure 18:
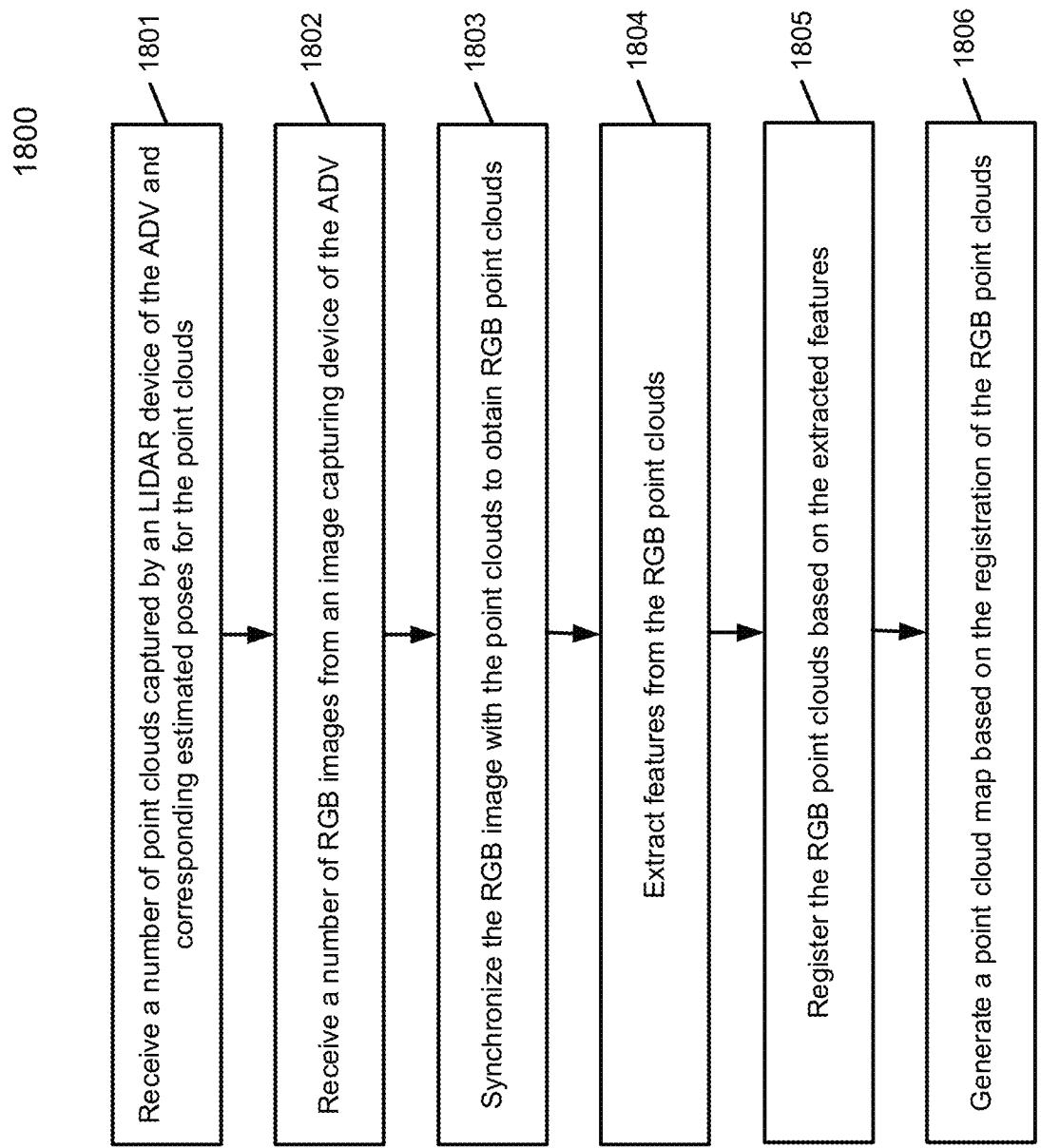
FIG. 18 is a flow diagram illustrating an example of a method according to one embodiment.

FIG. 18 is a flow diagram illustrating an example of a method according to one embodiment. Process 1800 may be performed by processing logic which may include software, hardware, or a combination thereof. For example, process 1800 may be performed by a RGB point clouds module, such as RGB point clouds module 309 of FIG. 16. Referring to FIG. 18, at block 1801, processing logic receives a number of point clouds captured by one or more LIDAR sensors of an ADV and corresponding poses. At block 1802, processing logic receives a number of RGB images from one or more image capturing sensors of the ADV. At block 1803, process logic synchronizes the RGB images with the point clouds to obtain RGB point clouds. At block 1804, processing logic extracts features from the RGB point clouds, the features including contextual and spatial information of the RGB point clouds. At block 1805, processing logic registers the RGB point clouds based on the extracted features. At block 1806, processing logic generates a point cloud map based on the registration of the RGB point clouds.

In one embodiment, synchronizing the RGB image with the point clouds to obtain RGB point clouds includes for each point cloud, determining a timestamp of the point cloud, locating a RGB image from the number of RGB images that has a timestamp within a temporal threshold of the timestamp of the point cloud, and associating the RGB image with the point cloud by associating one or more pixels with one or more points of the point cloud. In another embodiment, extracting features from the RGB point clouds includes extracting features based on contextual and spatial information from both the RGB image and the associated point clouds.

In one embodiment, the contextual information includes color pattern and complexity of color pattern of the features, where spatial information includes information about location of points of the features. In one embodiment, registering the point clouds based on the extracted features includes applying an optimization algorithm to the number of cloud points. In one embodiment, the optimization algorithm includes an iterative closest point (ICP) algorithm.

In one embodiment, processing logic further applies a RANSAC algorithm to the extract features for outlier features. In one embodiment, processing logic further registers the point clouds for a points-based registration based on RGB point clouds. In one embodiment, the points-based registration includes applying an RGB-based ICP algorithm to the registered point clouds, where RGB information is integrated into a cost function of the ICP algorithm.

Figure 19:
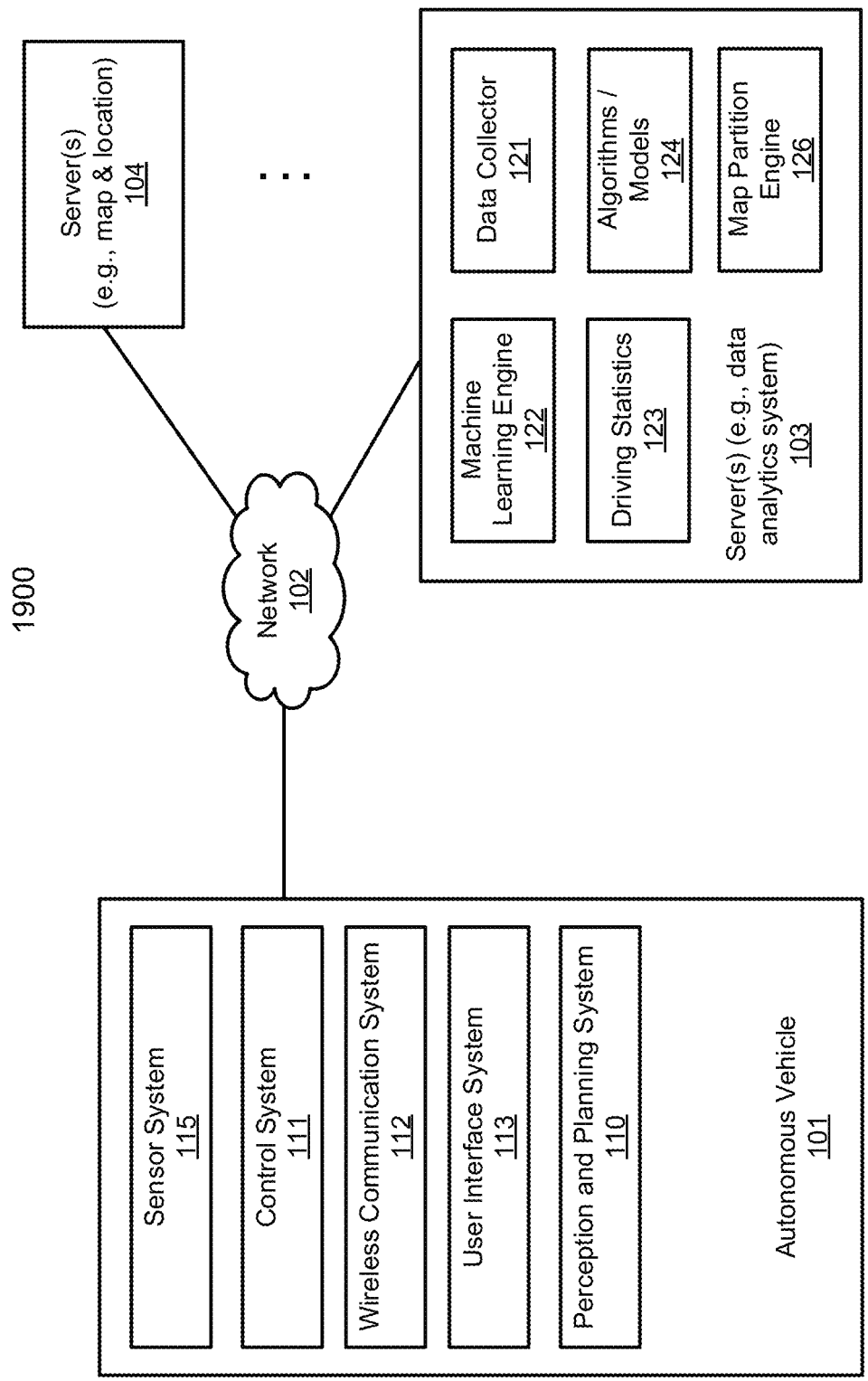
FIG. 19 is a block diagram illustrating an example of a perception and planning system used with an autonomous vehicle according to one embodiment.

FIG. 19 is a block diagram illustrating an autonomous vehicle network configuration according to some embodiments of the disclosure. Referring to FIG. 19, network configuration 1900 includes autonomous vehicle 101 that may be communicatively coupled to one or more servers 103-104 over a network 102. Similar to FIG. 1, server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, server 103 includes map partition engine 126. Furthermore, algorithms/models 124 can include a number of algorithms/models to extract road markings and curbs points. Using on a map provided by map server 104 (or generated by HD map generation engine 125), engine 126 partitions the map into one or more portion based the road markings and curb points extraction.

Thereafter, portions of the map may be uploaded, portion-by-portion, on ADVs to be utilized during autonomous driving in real-time by the ADVs. Although engine 126 is shown as part of server 103, in some embodiments, engine 126 may be part of server 104. In another embodiment engine 126 may be part of ADV 101, such as, part of perception and planning system 110 of FIG. 3A. For example, a map may be generated real-time by ADV 101 and a map partition engine, such as engine 126, may partition the map into portions to be uploaded from ADV 101 onto server 103/104, portion-by-portion.

Figure 20:
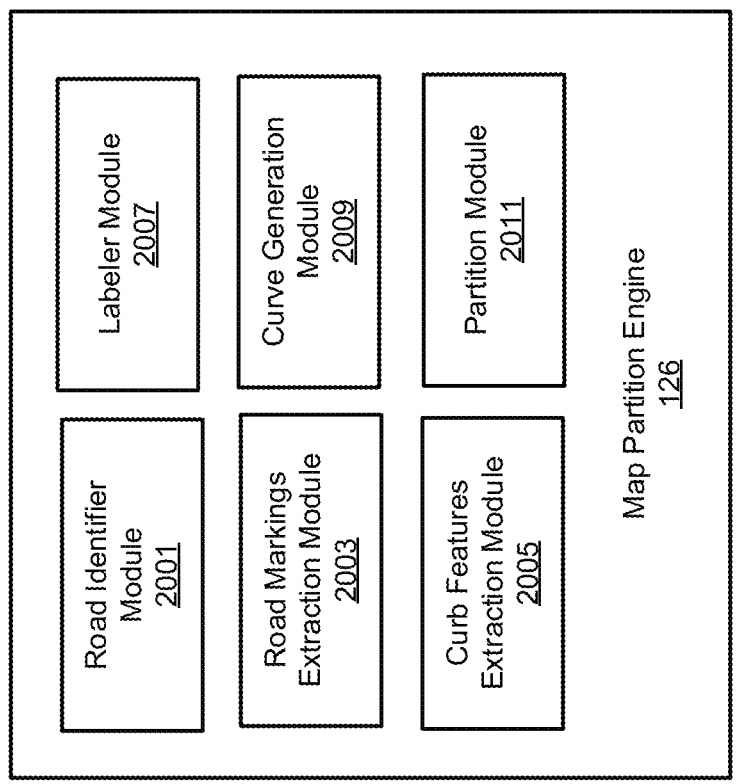
FIG. 20 is a block diagram illustrating an example of a map partition module according to one embodiment.

FIG. 20 is a block diagram illustrating an example of a map partition engine according to one embodiment. Map partition engine 126 can extract roads and curbs of a map and partition the map based on the extractions. Referring to FIG. 20, in one embodiment, map partition engine 126 can include a number of modules, such as road identifier module 2001, road markings extraction module 2003, curb features extraction module 2005, labeler module 2007, curve generation module 2009, and partition module 2011.

Road identifier module 2001 can identify a road within a point clouds map. Road markings extraction module 2003 can extract road markings from the identified road. Curb features extraction module 2005 can extract curb features for the identified road. Labeler module 2007 can label the curb points associated with the curb features. Curve generation module 2009 can generate a curve representative of the curb points. Partition module 2011 can partition the map based on the identified road markings and curb curve.

Figure 21:
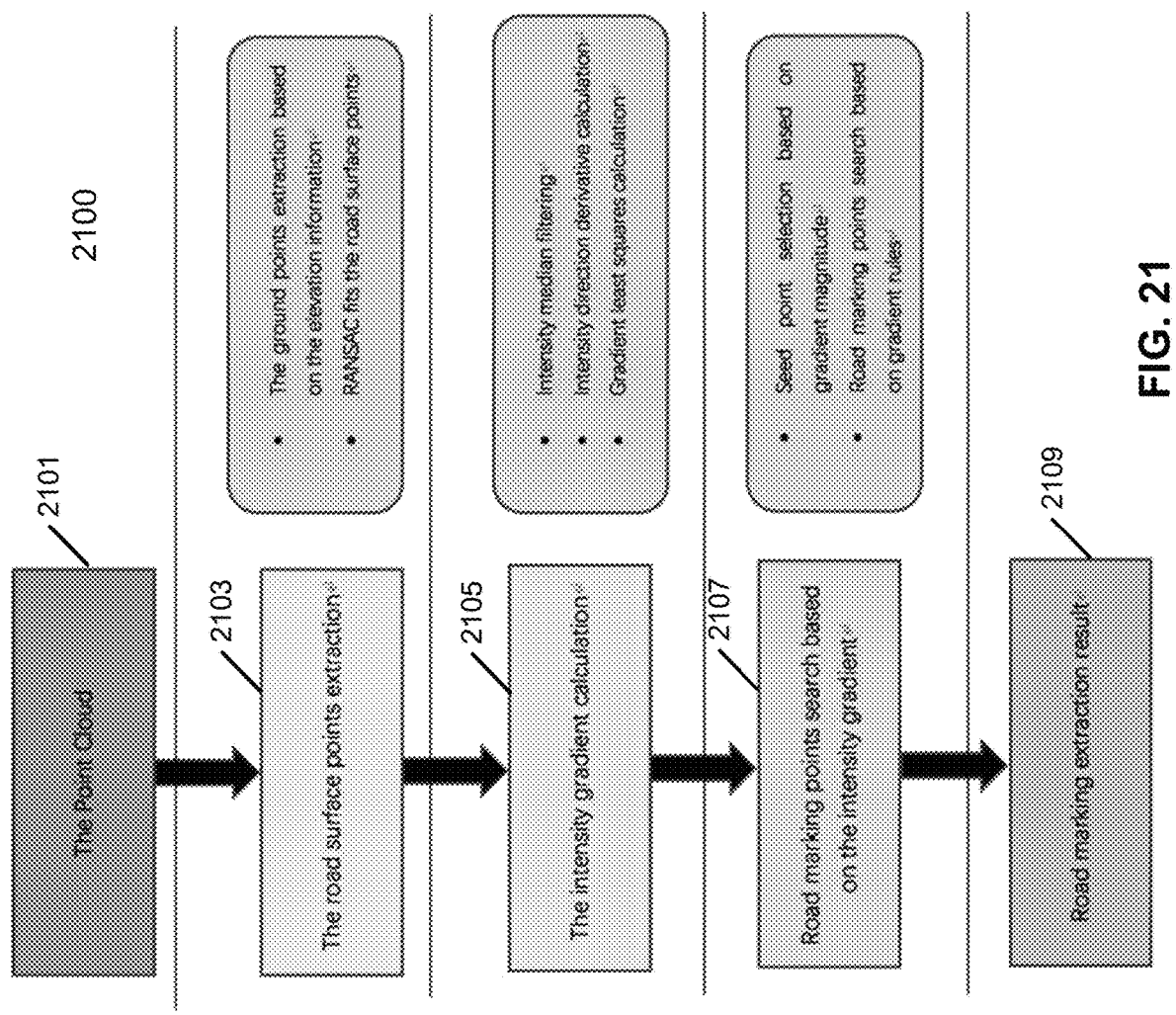
FIG. 21 is a flow chart illustrating an example of road marking extractions according to one embodiment.

FIG. 21 is a flow chart illustrating an example of road markings extractions according to one embodiment. Flow chart 2100 can be performed by road identifier module 2001 and/or road markings extraction module 2003 of FIG. 20. Before road point clouds can be identified, in one embodiment, point clouds are processed by a map global static point cloud map (GSPCM) generation process. The generation process removes any dynamic objects for map generation, e.g., only static objects are retained for map generation. Dynamic objects can be detected by capturing a geographic site at least twice, at different times. Static and dynamic objects can then be identified using an image segmentation algorithm. Image segments with features that have changed within the two revisits can be flagged as dynamic objects and are thus removed for map generation. The map generation process can then generate a global real world map, e.g., similar to that of a map used by a GPS device. In one embodiment, map generation applies a transformation to the static frame points to obtain the GSPCM The GSPCM is then divided into a two-dimensional (2D) grid (or blocks) of point clouds before road surface points and road markings can be extracted. An example transformation can be as follows:

$$GSPCM = \sum_{i}^{N} \sum_{j}^{M} T_i Pt_i^j$$

where $T_i$ means the i-th frame transform matrix, $Pt_i^j$ mean the j-th point of the i-th frame, and M indicates the number of points for the i-th frame, and N is the total number of point clouds frames.

Referring to FIG. 21, in one embodiment, flow chart 2100 receives point clouds 2101. Point clouds 2101 may be a block of point clouds from the 2D grid of GSPCM. Process 2103 then extracts ground surface points from point clouds 2101. In one embodiment, ground surface points extraction can be performed based on elevation information of points from the point clouds 2101. For example, process 2103 can identify a single point with a lowest elevation from the point clouds. Thereafter, points having an elevation within a predetermined threshold of the identified lowest elevation are identified as ground points. In another embodiment, an average of elevation of ground pixels near the vehicle is determined. The ground surface points are then determined to be within a predetermined threshold from the average elevation.

In some embodiments, a fitting algorithm such as RANSAC is applied to the point clouds to identify planar objects or planes (e.g., the road surface) based on the identified ground points. RANSAC is useful to remove outlier points from consideration. The fitting algorithm such as RANSAC can be applied iteratively, and after each fitting, outlier points are discarded and the remaining points are again applied the fitting algorithm to obtain one or more planes as potential ground planes. The points representing a single plane with a normal direction parallel to a Z axis (vertical axis to the LIDAR sensors unit capturing the point clouds) having the largest area can then be taken as the road surface points.

Based on the road surface points, in one embodiment, process 2105 calculates an intensity gradient, $\vec{G}_p=(\hat{f}_x, \hat{f}_y)$, from the road surface points. Intensity gradient is a directional change in the intensity values of an image (e.g., of any two closest points in the image). In one embodiment, calculating an intensity gradient includes applying a filter, such as a median filter, to the road surface points. Median filtering, or median intensity filtering is a filter used to remove noise from a point clouds image to better highlight gradients of an image. A medium filter can be applied to road surface points to remove salt and pepper intensity noise from the road surface points. An example median filtering may apply the following algorithm: 1) For each point, identify neighboring points within a predetermined neighbor size around the point. The neighboring points can be identified using a 2D or 3D or any dimension KD tree. 2) Sort the identified neighboring points by their intensity values. 3) Thereafter, the point is assigned the median intensity value from the sorting as the intensity value.

In one embodiment, calculating the intensity gradient includes determining an intensity direction based on the intensity values of each point and its neighboring points. The intensity direction or direction derivatives of the intensity in the x and y directions can be calculated for each point. Magnitudes and directions of the gradients can then be calculated based on the direction derivatives. In another embodiment, a gradient can be estimated by applying a least square method to neighboring points for each point. An intensity gradient can then be estimate based on the directional derivatives and the estimated gradient.

Next, based on the intensity gradient, e.g., the magnitudes, a clustering algorithm, such as a k-means clustering algorithm, can be used to cluster the gradient points into two categories, where a first cluster is a cluster for road surface points with magnitudes above a predetermined threshold, and a second cluster is a cluster for all other points with magnitudes below the predetermined threshold or a second predetermined threshold. Here, the points in the first cluster are road surface points.

Figure 22:
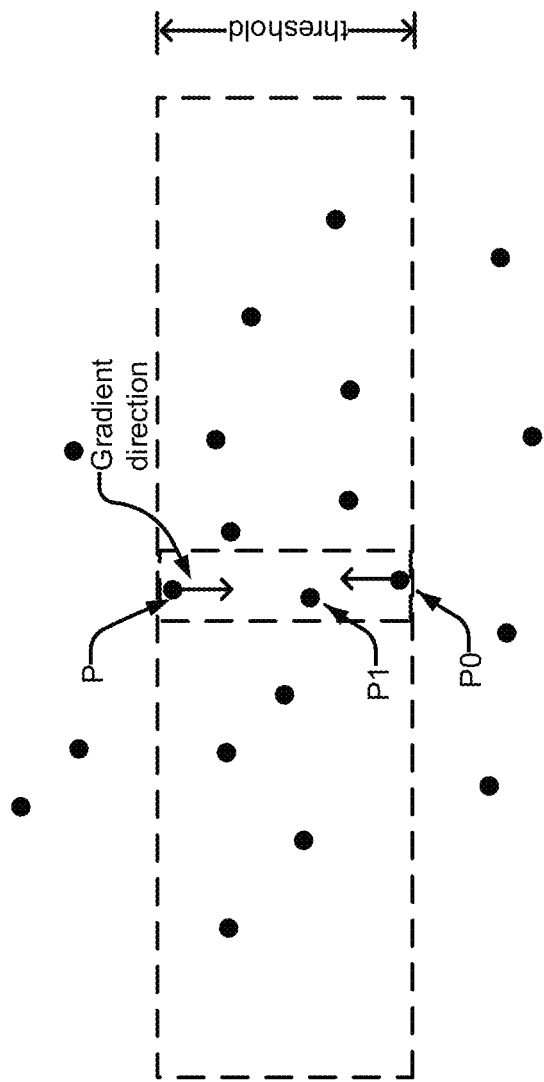
FIG. 22 illustrates an example of a search to extract road marking points according to one embodiment.

For process 2107, each point in the first cluster can be used as seed points to derive or extract road marking points. An example of a search to extract road markings points can be illustrated by FIG. 22 according to one embodiment. Referring to FIGS. 21 and 22, in one embodiment, point P can be an example of a seed point in the first cluster. Based on point P, process 2107 determines a point P0 within a predetermined threshold distance away from P with the same (or opposite) in intensity gradient direction from P. Thereafter, process 2107 identifies and categorizes all points along P to $P_0$ as road marking points. Referring to the example in FIG. 22, point $P_1$ is situated between P and $P_0$, where P and $P_0$ in this example have opposite directional intensity gradients. Because $P_1$ is situated between P and $P_0$, $P_1$ is identified and marked as a road marking point. Process 2107 can be performed iteratively using points in the first cluster until all the points in the first cluster are exhausted. Thus, effectively growing road marking points based on seed points of the first cluster. Process 2109 then captures the road marking points as road marking extractions results.

Figure 23:
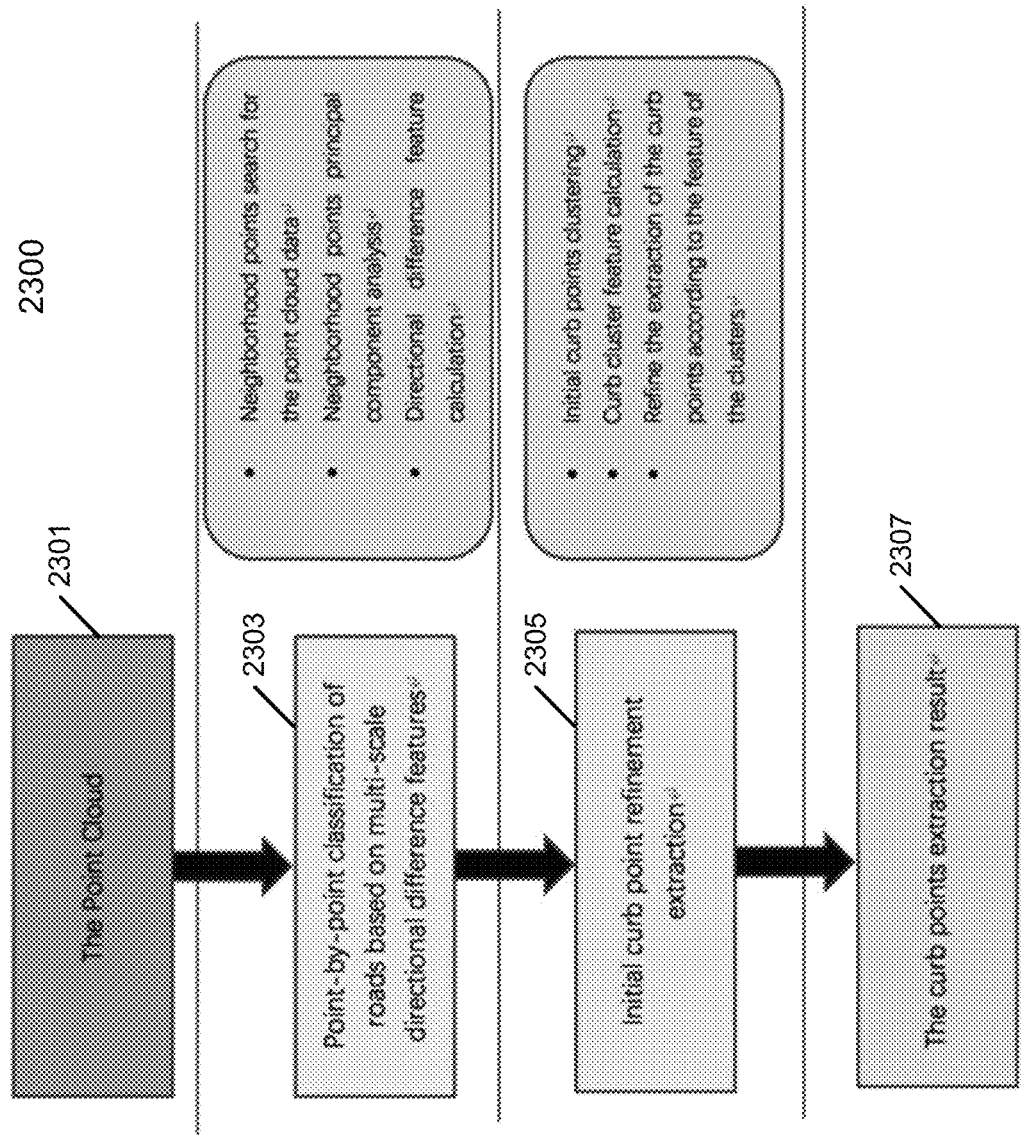
FIG. 23 is a flow chart illustrating an example of road curb extractions according to one embodiment.

FIG. 23 is a flow chart illustrating an example of road curbs extractions according to one embodiment. Flow chart 2300 can be performed by curb features extraction module 2005 of FIG. 20 to extract points from point clouds which belong to curbs (e.g., the left and right boundaries of a road). Referring to FIG. 23, flow chart 2300 receives point clouds 2301. For operation 2303, a number of features can be extracted from each point of the point clouds. The features can include elevation related features, intensity features, and multi-scale directional difference features, etc. An example of multi-scale directional difference features extractions is illustrated in FIG. 24 according to one embodiment.

Figure 24:
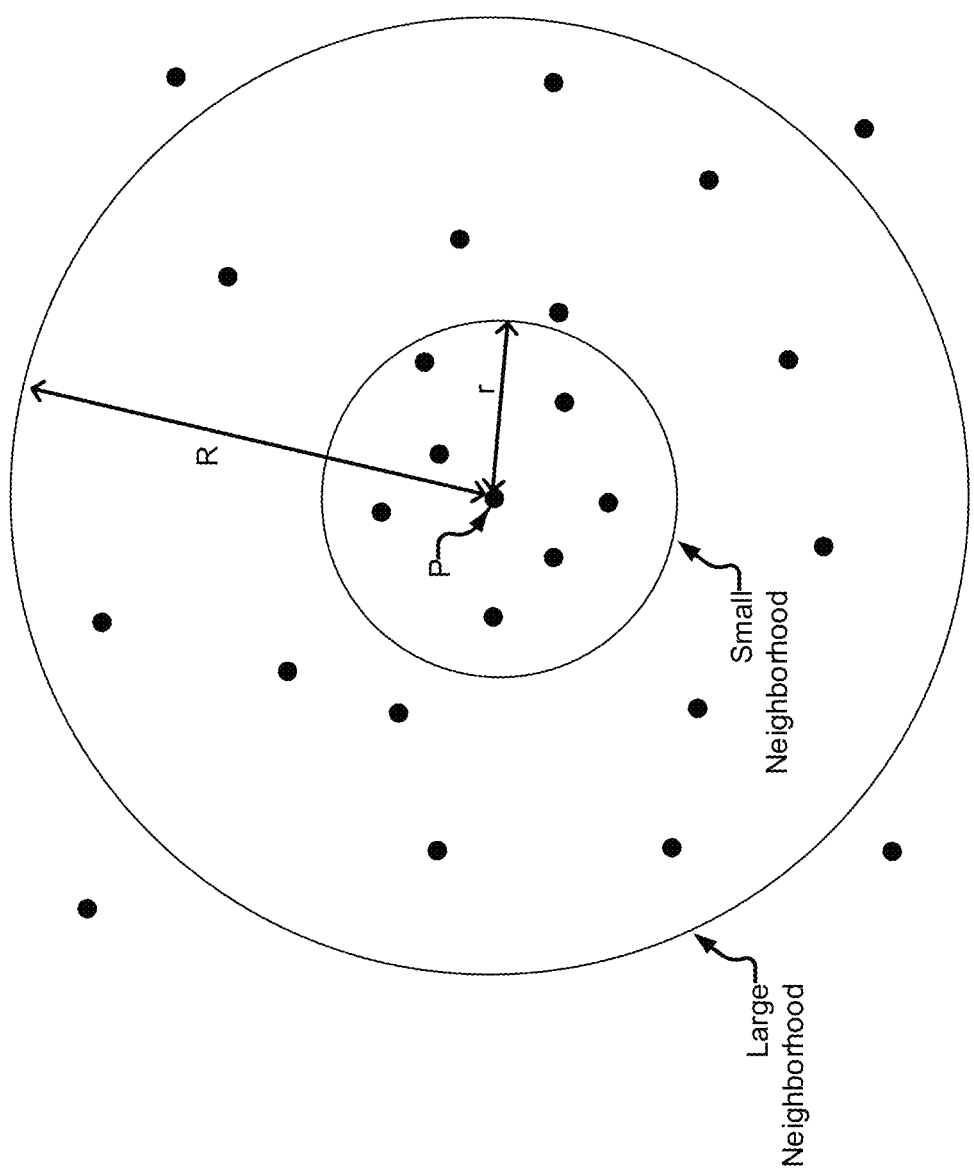
FIG. 24 illustrates an example of road curb extractions according to one embodiment.

Referring to FIGS. 23-24, multi-scale directional difference features can be extracted by: 1) For each point (e.g., P), setting a small neighborhood radius r, a large neighborhood radius R, and identifying points sets $N_{small}$ or $N_s$ and $N_{large}$ or $N_l$ respectively within the corresponding radius neighborhood. Here, the points in $N_l$ can be inclusive of the points in $N_s$. 2) Next, a statistical algorithm such as a principal component analysis (PCA) algorithm can be applied to the two points sets to obtain two normal vectors $NV_{small}$ and $NV_{large}$ (not shown), respectively, where a normal vector can be any point of a plane, where the plane is being estimated by a respective set of points, and the normal vector has a direction that is orthogonal (e.g., perpendicular) to a surface of the plane. 3).

An angle θ (not shown) is then calculate between the $NV_{small}$ and $NV_{large}$, where angle θ can be a multi-scale direction difference feature for point P. Note that principal component analysis (PCA) is a statistical procedure which uses an orthogonal transformation to convert a set of observations into a set of values of linearly uncorrelated variables called principal components. A normal vector can be calculated as a vector having a direction perpendicular to the principal components. In another embodiment, features can be extracted and road curbs can be identified within a point clouds image by applying a supervised machine learning algorithm to the point clouds.

In one embodiment, elevation related features or elevation values for point clouds can be determined based on a height of the determined ground surface. Furthermore, elevation distribution variances (e.g., $V_s$ and $V_l$), and differences in elevation between a highest point and a lowest point (e.g., $D_s$ and $D_l$) of each respective points set $N_s$ and $N_l$ can be calculated. Here, variance is an expectation of a squared deviation of elevations from its mean elevation for a respective points set.

In one embodiment, operation 2305 can extract initial curb points from the point cloud using a Naive Bayes classifier algorithm. For example, for every point, a 5-dimension set of features which includes θ, $V_s$, $V_l$, $D_s$ and $D_l$, can be used by a Naive Bayes classifier algorithm to classify the point into a curb point category and a non-curb point category. The category of curb points can be used as initial curb points.

In one embodiment, directional characteristics or directional features of each initial curb point can be calculated based on the neighboring points of the initial curb points. For example, directional characteristics can be calculated as follows. 1) Generate a KD tree with all the initial curb points. 2) search for k neighborhood points of each initial curb point using the KD tree. 3) Perform principal component analysis (PCA) on the neighborhood points of each initial curb point to obtain a main direction of the neighborhood points, where the main direction is the directional feature for the point.

In one embodiment, clustering or grouping of points can be performed on the initial curb points based on the calculated directional features for curb markings generation. For example, clustering of initial curb points can be performed by the following operations 1-5 according to one embodiment. 1) Initialize a radius r' for a cluster, a direction angle threshold at, and an elevation difference threshold et; initialize all the curb points to "non-clustering"; initialize an empty seed point queue $Q_{seed}$ and an empty cluster container $V_{curb}$; and construct a KD tree using all the initial curb points. 2) Randomly select a point from the initial curb point of "non-clustering" as an initial seed point $P_g$ to grow, and initialize the label the seed point $P_g$ as $L_g$ (e.g., curb points), insert (or push) the seed point $P_g$ into the cluster container $V_{curb}$, and set it as "clustering". 3) The KD tree is used to get the set of neighborhood points which are within radius r' of the seed point $P_g$, for every point $P_n$ in the neighborhood.

If the angle between $P_n$ and $P_g$ is less than the at and the elevation difference between them is less than the et, then $P_n$ can be inserted (or pushed) to the seed point queue $Q_{seed}$ and the cluster container $V_{curb}$, the label of $P_n$ can be set as a same label of $P_g$, and $P_n$ can be set as "clustering". 4) If queue $Q_{seed}$ is not empty, then a point can be popped out from a head of the queue, and the point is taken as a new seed point, and operation resumes from operation 2). If the queue is empty, then the curb point cluster growth ends, and operation resumes from operation 1). 5) Operations 1-4 can be repeated until all points are set as "clustering". The clusters of curb points can then be used for road block partitioning.

In one embodiment, the clusters of curb points can be refined by calculating cluster features of each cluster. The refined clusters of curb points can then be used for road block partitioning. Examples of cluster features to be calculated can include $(a_1, a_2, a_3)$, length $L_c$ (e.g., a distance of points forming a line from the cluster), and/or a number of points $N_c$ for each cluster. Clusters that do not satisfy predetermined rules set for the cluster features can then be eliminated to refine the clusters. Example of a rule can be: $\{a_1 > \partial_1 \ \& \ a_2 > \partial_2 \ \& \ a_3 > \partial_3 \ \& \ L_c > l \ \& \ N_c > n\}$, where $\partial_1, \partial_2, \partial_3$, l, n are predetermined dimensional thresholds, a predetermined cluster minimum point length, and a predetermined minimum number, respectively.

In one embodiment, the characteristics $(a_1, a_2, a_3)$ can be calculated by applying a principal component analysis (PCA) algorithm to points in the cluster to obtain eigenvalues $(\lambda_1, \lambda_2, \lambda_3)$ of a covariance matrix of the points. The characteristics $(a_1, a_2, a_3)$ can then be calculated by the follow formulation:

$$a_1 = \frac{\sqrt{\lambda_1} - \sqrt{\lambda_2}}{\sqrt{\lambda_1}},$$

$$a_2 = \frac{\sqrt{\lambda_2} - \sqrt{\lambda_3}}{\sqrt{\lambda_1}},$$

$$a_3 = \frac{\sqrt{\lambda_3}}{\sqrt{\lambda_1}}.$$

In one embodiment, for operation 2307, one or more Cubic Bezier curves can be generated (by curve generation module 2009 of FIG. 20) to represent one or more curb lines based on the extracted curb points, whose formula is as follow:

$$P(t) = \Sigma_{i=0}^{3} P_i B_{i,3}(t) = (1-t)^3 P_0 + 3t(1-t)^2 P_1 + 3t^2(1-t) P_2 + t^3 P_3, t \in [0,1],$$

where $P_0$, $P_1$, $P_2$, and $P_3$ are constants.

Based on the one or more generated curb curves, curb boundaries of a road can be identified. Based on the identified road curb boundaries, a road can be partitioned (by partition module 2011 of FIG. 20). In one embodiment, the road can then be partitioned based on the curb boundaries and/or road marking points, where the curb boundaries are the road boundaries, e.g., boundaries parallel to a direction of vehicles travelling on the road.

Figure 25:
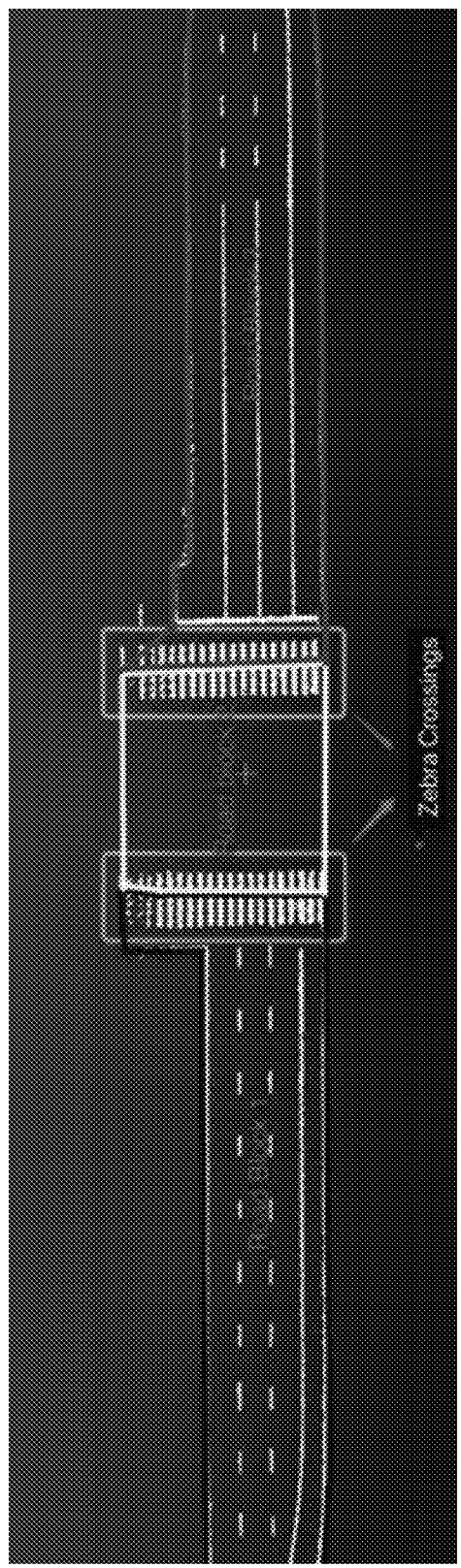
FIG. 25 illustrates an example of map partition according to one embodiment.

FIG. 25 illustrates an example of map partition according to one embodiment. A road can be partitioned based on extracted road marking points and extracted curb points/curves, as described above. For example, based on extracted road marking points, a Euclidean clustering algorithm can be applied to the road markings points to cluster together the road marking points based on a predetermined distance and/or boundary threshold for the points. Thereafter, one or more clusters can be grouped together and be categorized as a type of road markings. The clusters can be categorized based on a predetermined set of types. The types of road markings can include zebra road markings, pedestrian cross markings, road intersection road markings, etc.

In one embodiment, a cluster can be categorized as a type based on a distance threshold between each of the clusters, and a length threshold of a line formed by the points in the each cluster. For example, for a zebra crossing type, if a boundary size of a cluster is less than the first predetermined threshold (e.g., a short dashed lines can be one cluster, exhibited by dashed lines in a zebra crossing markings as illustrated in FIG. 25) then a center point is determined for the cluster. The center points for other surrounding clusters can then be grouped using a Euclidean clustering algorithm to generate a center line cutting across the zebra crossing markings. Based on the center line of the zebra crossings (and/or other road markings), a zebra crossing block (such as road block 2 of FIG. 25) can be identified.

Other road blocks (e.g., road blocks 1 and 3) can then be partitioned based on the zebra crossing block. For example, referring to FIG. 25, road block 1 can be partitioned based on road block 2 at a center line of a zebra crossing of road block 2. Road block 3 can be partitioned based on road block 2 at another center line of a different zebra crossing of road block 2. Thus, based on the road markings points and curb points/curve, a map can be partitioned into block partitions. Thereafter, when a server is required to upgrade a map to a vehicle or to download a map from the vehicle, the upgrade/download processing can be performed block-by-block based on the partitioned blocks.

Figure 26A:
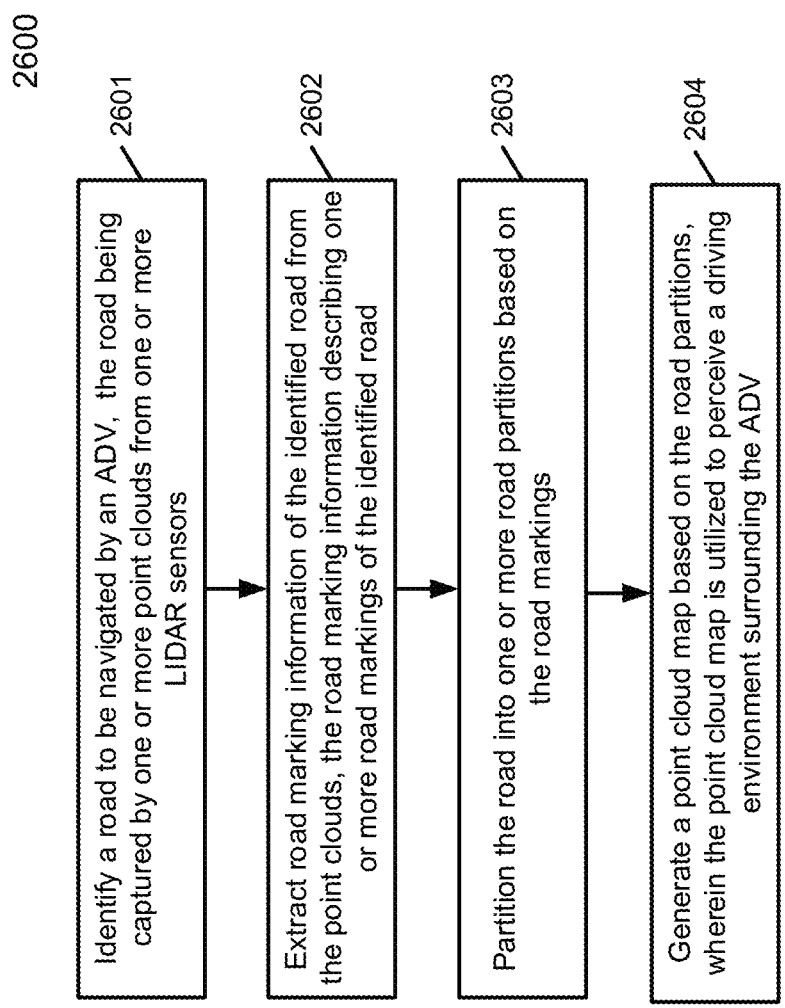
FIGS. 26A and 26B are flow diagrams illustrating examples of methods according to some embodiments.
Figure 26B:
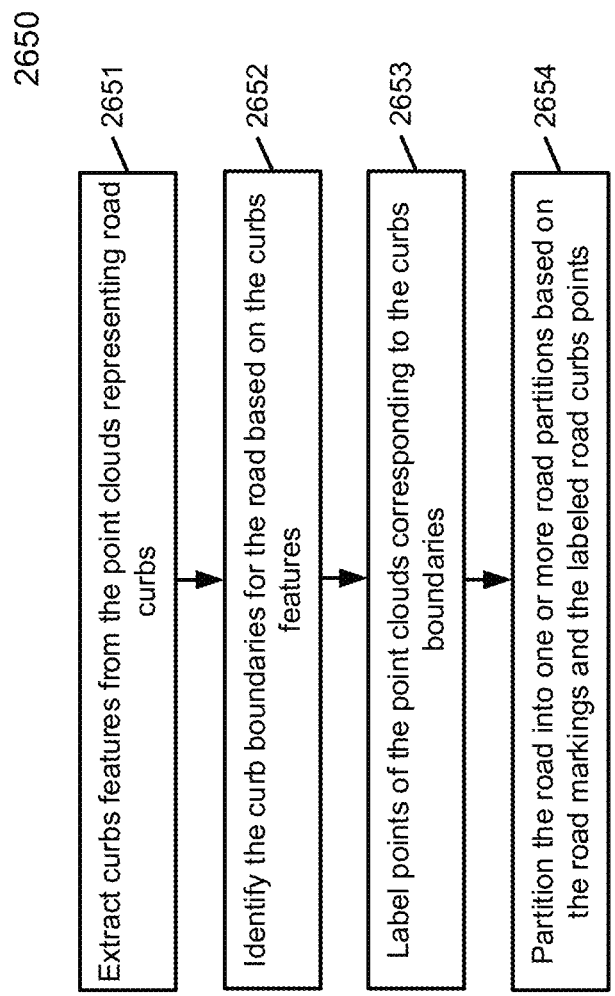

FIGS. 26A and 26B are flow diagrams illustrating examples of methods according to some embodiments. Processes 2600 and 2650 may be performed by processing logic which may include software, hardware, or a combination thereof. For example, processes 2600 and 2650 may be performed by a map partition engine 126 of FIG. 20. Referring to FIG. 26A, at block 2601, processing logic identifies a road to be navigated by an ADV, the road being captured by one or more point clouds from one or more LIDAR sensors. At block 2602, processing logic extracts road marking information of the identified road from the point clouds, the road marking information describing one or more road markings of the identified road. At block 2603, processing logic partitions the road into one or more road partitions based on the road markings. At block 2604, processing logic generates a point cloud map based on the road partitions, where the point cloud map is utilized to perceive a driving environment surrounding the ADV.

In one embodiment, the point cloud map includes a static point cloud map, where the static point cloud map include is generated by removing one or more dynamic objects in the point cloud map, where the dynamic objects are removed by gathering two or more point cloud observations at different points in time for a same location and detecting a difference between the two or more point cloud observations. In one embodiment, identifying the road includes applying an elevation threshold to the point clouds to extract a number of likely ground points, applying a fitting algorithm to fit one or more planar objects to the likely ground points as an road object, and selecting a planar object with the largest surface area having a normal direction approximating a direction of a vertical axis of the LIDAR sensors as the road object.

In another embodiment, processing logic further identifies point clouds corresponding to the road object as road surface points. In another embodiment, extracting the road markings includes applying a filter to remove noise for road surface points, determining a directional gradient for road surface point clouds, and applying a k-means clustering algorithm to the road surface point clouds based on a predetermined threshold for the directional gradient to divide the road surface point clouds into road markings points and other road surface points. In another embodiment, the road markings include markings for at least a pedestrian crossing and where the road is partitioned based on the markings for the pedestrian crossing.

Referring to FIG. 26B, at block 2651, processing logic extracts curbs features from the point clouds representing road curbs. At block 2652, processing logic identifies curb boundaries for the road based on the curbs features. At block 2653, processing logic labels points of the point clouds corresponding to the curb boundaries. At block 2654, processing logic partitions the road into one or more road partitions based on the road markings and the labeled road curbs points.

In one embodiment, extracting curbs features for the point clouds includes, for each point in the point clouds, extracting one or more multi-scale directional difference features to identify the road curbs. In another embodiment, identifying curbs boundaries for the road based on the curbs features includes, for each point in the point clouds, applying a machine learning algorithm to the extracted features to identify the point as an initial curb point; and for each initial curb point, determining one or more directional characteristics of the initial curb point, generating a point cluster based on the initial curb point, determining one or more characteristics for the point cluster, and identifying the point cluster as a portion of curb boundaries if the one or more characteristics satisfy a predetermined condition. In another embodiment, processing logic further generates a curve to represent each of the point cluster, where the curve includes a Cubic Bezier curve, and where the road is partitioned into the one or more road partitions based on the road markings and the generated Cubic Bezier curve.

Figure 27:
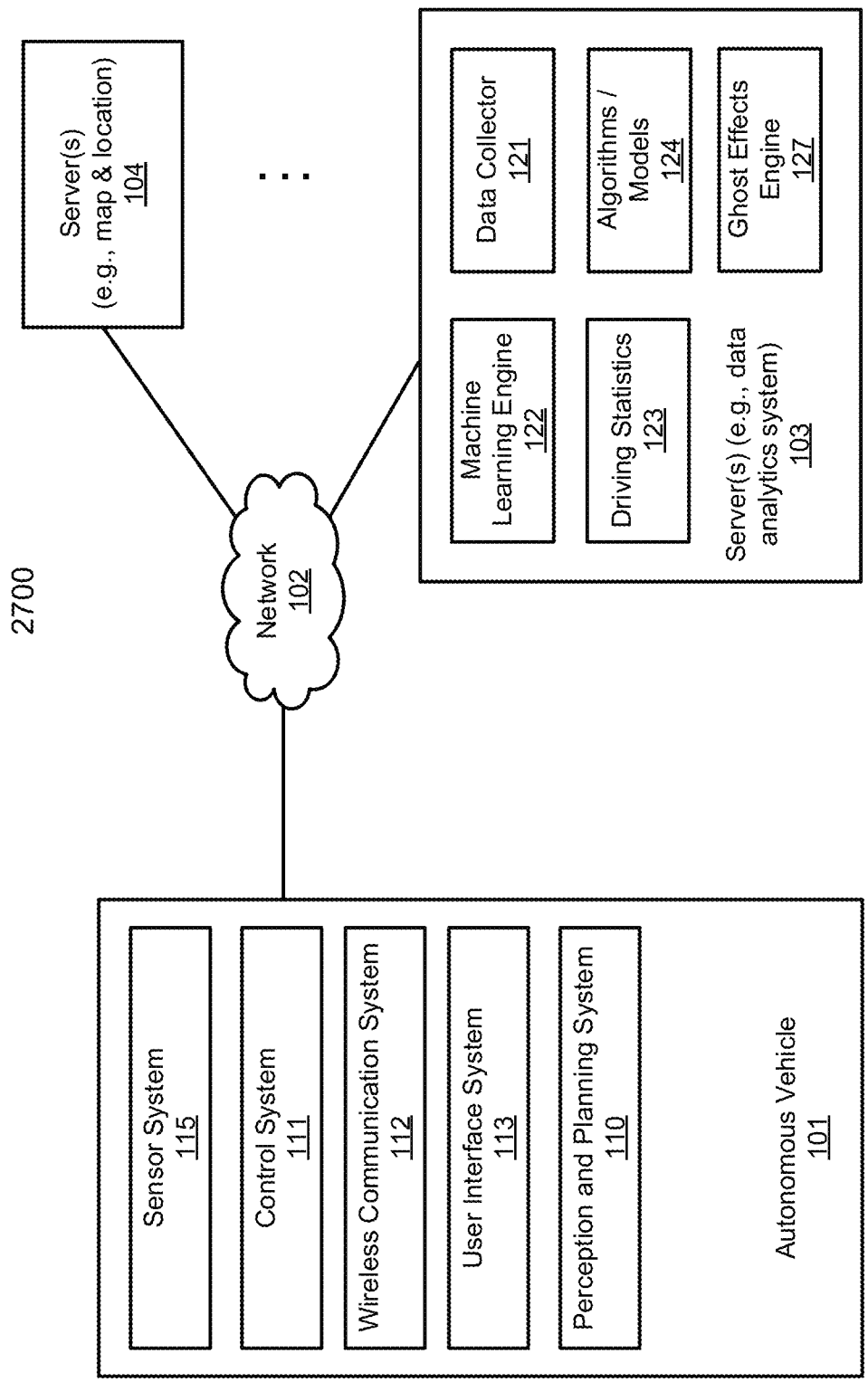
FIG. 27 is a block diagram illustrating an example of a perception and planning system used with an autonomous vehicle according to one embodiment.

FIG. 27 is a block diagram illustrating an example of a perception and planning system used with an autonomous vehicle according to one embodiment. Referring to FIG. 27, network configuration 2700 includes autonomous vehicle 101 that may be communicatively coupled to one or more servers 103-104 over a network 102. Similar to FIG. 19, server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, server 103 includes ghost effects engine 127. Ghost effects engine 127 can detect ghost images in frames of point clouds.

Ghosting effects (or ghost effects, shadows) of point clouds can be identified in consecutive point clouds frames if an object in any two consecutive frames abruptly appears or disappears. An object can abruptly appear or disappear due to errors in fusing together portions of point clouds, or low accuracy in capturing of fast moving objects or reflective objects. For example, objects that suddenly appear or disappear in consecutive frames should be regarded as ghost objects. Such ghost objects should be removed from a point cloud map. Because it is critical to ensure a high accuracy for HD maps, it is critical to identify ghost objects in point clouds for purposes of evaluating the accuracy of point clouds for HD map generation and/or HD map validation.

Figure 28:
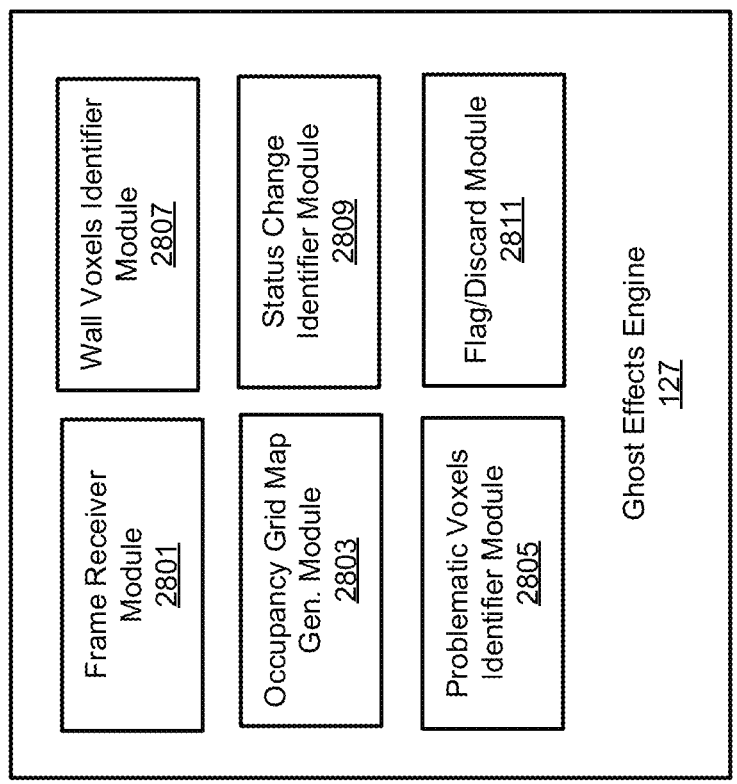
FIG. 28 is a block diagram illustrating an example of a ghost effects engine according to one embodiment.

FIG. 28 is a block diagram illustrating an example of a ghost effects engine according to one embodiment. Ghost effects engine 127 can receive a number of frames of point clouds to flag which frames have ghosting images. The flagged frames can be removed from map generation and/or used for map validation. Referring to FIG. 28, in one embodiment, engine 127 includes a number of modules, such as frame receiver module 2801, occupancy grid map generation module 2803, problematic voxels identifier module 2805, wall voxels identifier module 2807, status change identifier module 2809, and flag/discard module 2811. Some or all of these modules can be integrated into fewer modules.

Frame receiver module 2801 can receive a number of frames of point clouds from a map server such as server 104 of FIG. 27. Occupancy grid map generation module 2803 can generate a three dimensional (3D) occupancy grid map, where point clouds frames can be projected onto the 3D occupancy grid map. Here, the occupancy grid map includes a number of voxels and each voxel includes an occupancy probability, e.g., a probability the voxel is occupied by an object. Problematic voxels identifier module 2805 can identify problematic voxels in the 3D occupancy grid map. Problematic voxels refers to voxels with abrupt status transitions, such as a transition from occupied to free, or from free to occupied occupancy statuses. Wall voxels identifier module 2807 can identify voxels which have probabilities greater than a predetermined threshold to represent a wall object. Status change identifier module 2809 can identify a status change for a voxel. Flag/discard module 2811 can flag problematic voxels and/or corresponding point clouds for later considerations of map generation and/or map validation.

Figure 29:
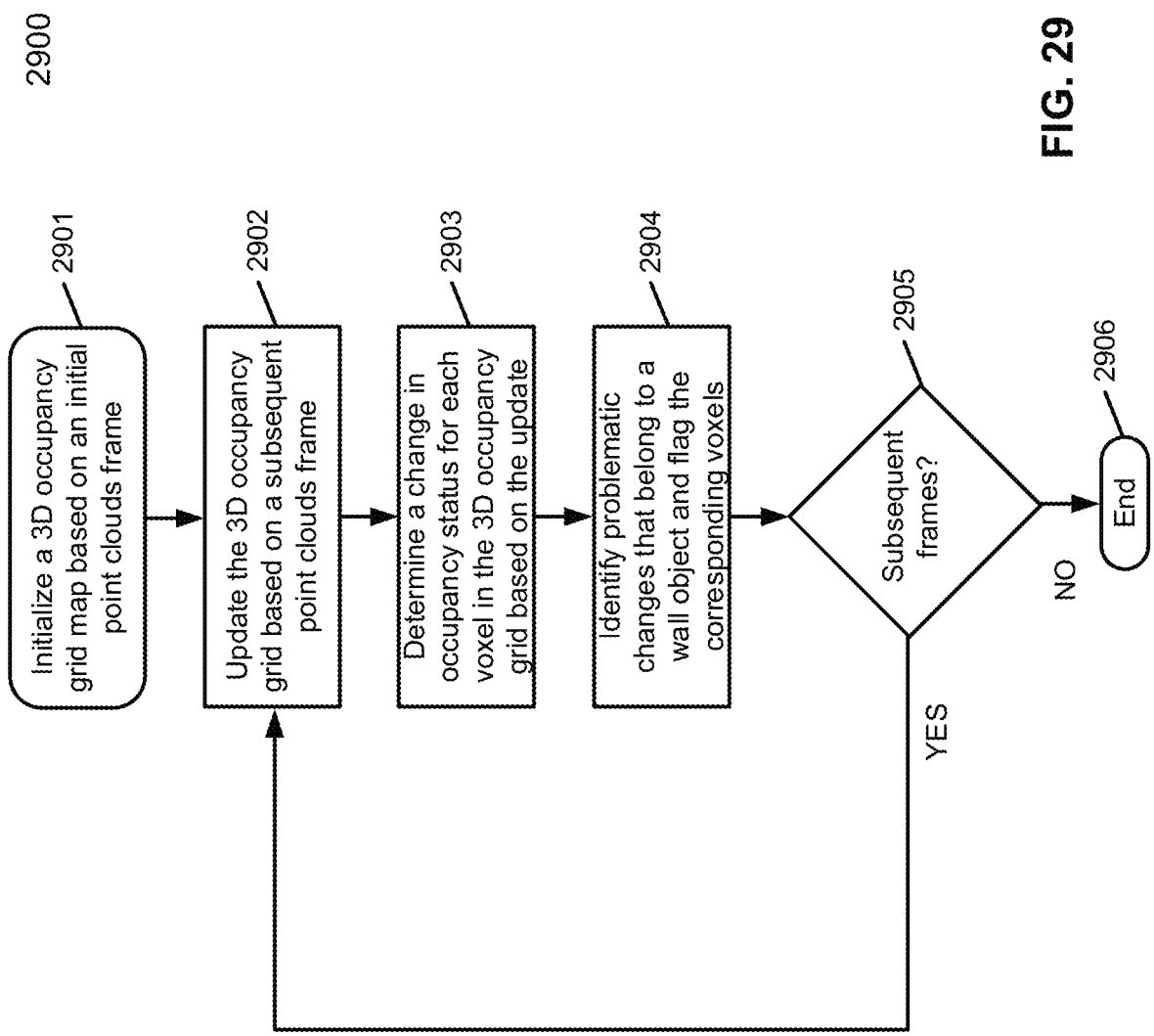
FIG. 29 is a flow chart illustrating an example of ghost effects detection according to one embodiment.

FIG. 29 is a flow chart illustrating an example of ghost effects detection according to one embodiment. Flow chart 2900 can be performed by a ghost effects engine, such as engine 127 of FIG. 28. Referring to FIG. 29, for operation 2901, engine 127 initializes a 3D occupancy grid map. The 3D occupancy grid includes voxels or 3D cells where each voxel includes a probability value that the voxel is occupied. After initialization, a ray cast operation is applied to the 3D occupancy grid map based on the initial point clouds frame to initialize occupancy status of each voxels in the 3D occupancy grid map. Note, here the initial point cloud frame and/or subsequent frames are previously registered, e.g., aligned using a SLAM type algorithm.

In one embodiment, rays can be projected from a position of the vehicle if the point clouds are of a perspective view. In another embodiment, rays can be casted from atop if the point clouds are of a bird's eye view. The ray casting operation passes rays through a view similar to a view of a LIDAR sensor. The rays may pass through some voxels and may end in some voxels. A voxel has a status of "free" if a ray passes through the voxel. A voxel has a status of "occupied" if a ray stops at the voxel. A voxel has a status of "unknown" if a ray does not pass through the voxel and the ray does not end at the voxel. Each of the "occupied" voxels can include a probability value indicating a probability the voxel is "occupied".

For operation 2902, as subsequent frames are received, engine 127 updates the 3D occupancy grid map based on the subsequent frames. Similar to the initial frame, a ray cast operation (e.g. a ray tracing algorithm) can be applied to the subsequent frame to cast the subsequent frame onto the 3D occupancy grid map. The probability value of each voxels can then be updated based on the subsequent ray cast using the following Bayesian formula:

$$P(n \mid z_{1:t}) = \left[1 + \frac{1 - P(n \mid z_t)}{P(n \mid z_t)} \frac{1 - P(n \mid z_{1:t-1})}{P(n1 z_{1:t-1})}\right]^{-1}$$

where, $P(n|z_t)$ represents a probability of occupancy for a voxel at time t from an observation at time t, $P(n|z_{1:t})$ represents a probability of occupancy for the voxel at time t from an observation at time t in view of all prior observations, and $P(n|z_{1:t-1})$ represents a probability of occupancy for the voxel at time t−1 in view of all its prior observations.

For operation 2903, engine 127 determines status changes for each voxel in the grid map. Each voxel of the grid map may include one of the following status changes:

A: "free"→"free"
B: "occupied"→"occupied"
C: "unknown"→"unknown"
D: "unknown"→"free"
E: "unknown"→"occupied"
F: "free"→"occupied"
G: "occupied"→"free".

For operation 2904, engine 127 identifies voxels having problematic status changes. For example, problematic status changes include status changes of F: "free"→"occupied" and G: "occupied"→"free". The problematic status changes can be identified if a change in the voxel's occupancy probability is greater than a predetermined threshold, e.g., if a difference (e.g., an increase or a decrease) in the occupancy probability is greater than the predetermined threshold.

Furthermore, voxels belonging to wall type objects can be identified. For example, an object detection algorithm (e.g., image segmentation, edge detection, machine learning neural network, etc.) can be applied to the point clouds frame to extract wall voxels or voxels corresponding to wall type objects. The wall objects can include planar objects having a normal direction of the plane perpendicular about a z-axis or the normal direction of the plane parallel about an x-y plane, in a Cartesian coordinate system. Although only planar wall types objects are described, wall objects can be any shapes or sizes. Based on the identified wall objects, corresponding wall voxels can be identified.

Thereafter, voxels with ghosting effects can be identified as the problematic voxels which are of wall voxels. Then, the ghost effects voxels are flagged and the flagged voxels and/or frames can then be considered for removal, in later map generation and/or map validation. For example, in one embodiment, if a count of ghost effects voxel for a frame is greater than a predetermined threshold then the frame is removed from the point clouds map generation.

For operation 2905, engine 127 determines if there is additional frame(s) to be processed. If yes, then operation resumes at operation 2902, otherwise operation ends at operation 2906.

Figure 30:
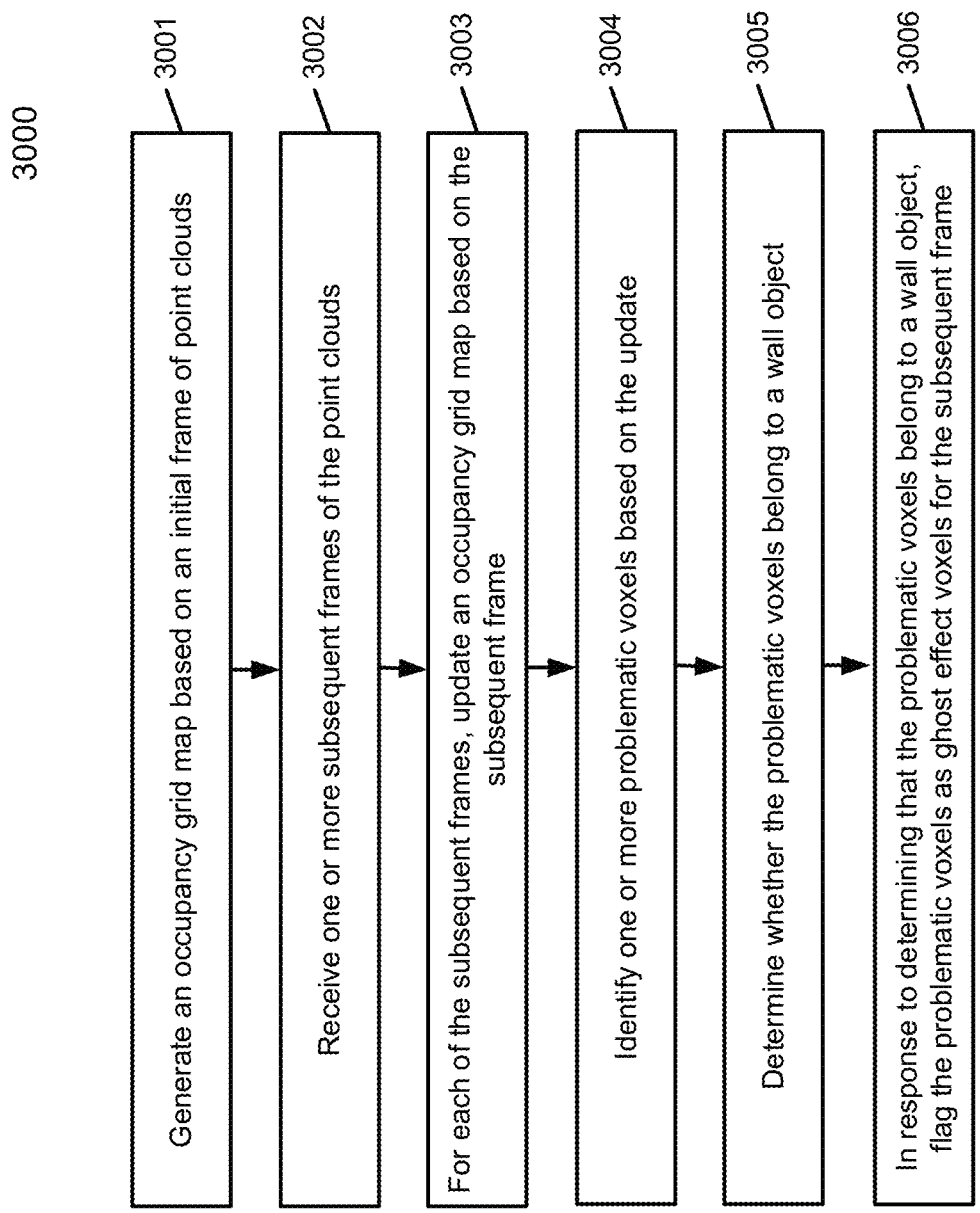
FIG. 30 is a flow diagram illustrating an example of a method according to one embodiment.

FIG. 30 is a flow diagram illustrating an example of a method according to one embodiment. Process 3000 may be performed by processing logic which may include software, hardware, or a combination thereof. For example, process 3000 may be performed by a ghost effects engine, such as engine 127 of FIG. 28. Referring to FIG. 30, at block 3001, processing logic generates an occupancy grid map based on an initial frame of point clouds. At block 3002, processing logic receives one or more subsequent frames of the point clouds. At block 3003, for each of the subsequent frames, processing logic updates an occupancy grid map based on the subsequent frame. At block 3004, processing logic identifies one or more problematic voxels based on the update. At block 3005, processing logic determines whether the problematic voxels belong to a wall object. At block 3006, in response to determining that the problematic voxels belong to a wall object, processing logic flags the problematic voxels as ghost effect voxels for the subsequent frame.

In one embodiment, processing logic further projects the initial frame or the subsequent frames onto the occupancy grid map using a ray tracing algorithm. In another embodiment, projecting the initial frame or the subsequent frames onto the occupancy grid map includes determining an occupancy status for each voxel in the occupancy grid map, where an occupancy status is one of: free, occupied, or unknown. In another embodiment, identifying one or more problematic voxels based on the update includes, for each voxel in the occupancy grid map, detecting a change in an occupancy status of the voxel and identifying the voxel as problematic if the occupancy status changes from free to occupied, or from occupied to free.

In one embodiment, the occupancy grid map is updated based on a subsequent frame by applying a Bayesian algorithm, where the occupancy grid map includes voxels indicating an occupancy probability. In one embodiment, determining whether the problematic voxels belong to a wall object includes identifying problematic voxels belong to objects having an attribute of a planar surface and a normal of the planar surface that is perpendicular to a vertical z-axis. In one embodiment, processing logic further removes a frame from a point cloud map if a number of the ghost effect voxels of the frame is greater than a threshold.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 31:
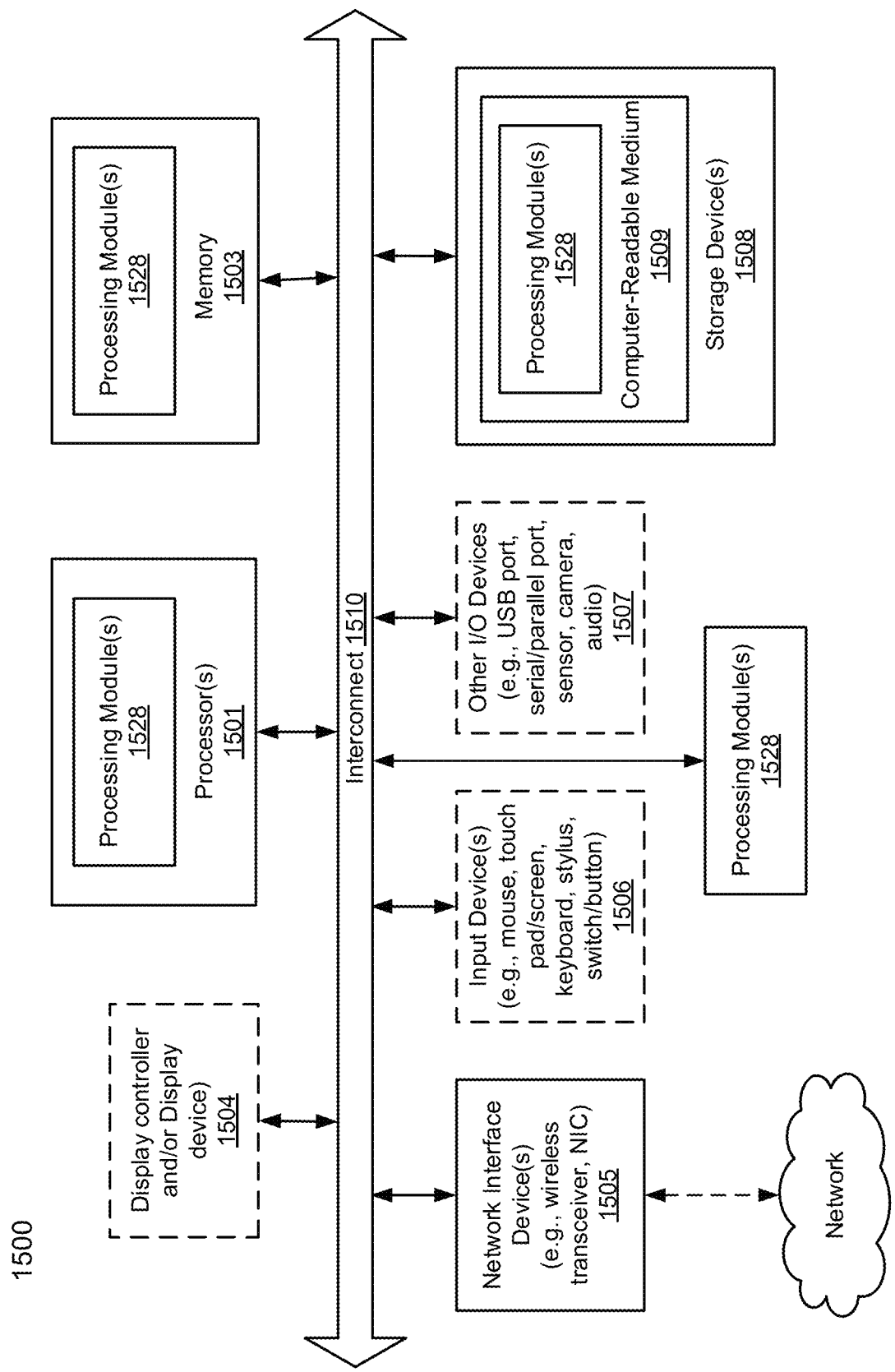
FIG. 31 is a block diagram illustrating a data processing system according to one embodiment.

FIG. 31 is a block diagram illustrating an example of a data processing system which may be used with one embodiment of the disclosure. For example, system 1500 may represent any of data processing systems described above performing any of the processes or methods described above, such as, for example, HD map generation engine 125 of FIG. 4, HD map generation system 500 of FIG. 5, pipeline 600 of FIG. 6, real-time map generation module 308 of FIG. 10, RGB point clouds module 309 of FIG. 15, map partition engine 126 of FIG. 19, ghost effects engine 127 of FIG. 27, perception and planning system 110 of FIG. 3A, or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, HD map generation engine 125 of FIG. 4, HD map generation system 500 of FIG. 5, pipeline 600 of FIG. 6, real-time map generation module 308 of FIG. 10, RGB point clouds module 309 of FIG. 15, map partition engine 126 of FIG. 19, ghost effects engine 127 of FIG. 27, perception and planning system 110 of FIG. 3A, or any of servers 103-104 of FIG. 1. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to register point clouds for an autonomous driving vehicle (ADV), the method comprising:

receiving a stream of frames of point clouds from one or more LIDAR sensors of an ADV and corresponding poses at real-time;

extracting segment information for each frame of the stream based on geometric or spatial attributes of points in the frame, wherein the segment information includes one or more segments of at least a first frame corresponding to a first pose;

extracting one or more features from each segment of each frame, including features from the first and a second frames;

detecting a loop closure between the first and the second frames based on the extracted features of the first and the second frames;

registering the stream of frames based on the segment information;

in response to detecting the loop closure between the first and second frames, localizing the second frame based on the frame registration; and generating a first point cloud map for the stream of frames based on the frame registration.

2. The method of claim 1, further comprising:

updating the first pose based on the localization and the frame registration to generate a second point cloud map.

3. The method of claim 1, wherein detecting the loop closure between the first and the second frames comprises applying an unsupervised machine learning algorithm to the features of the segments of the first and the second frames to determine if the two segments match.

4. The method of claim 3, wherein detecting the loop closure between the first and the second frames further comprises:

applying a RANSAC algorithm to the first and the second frames to determine if the two segments match.

5. The method of claim 4, wherein the unsupervised machine learning algorithm comprises a nearest neighbor search.

6. The method of claim 1, wherein the features are extracted from each segment of each frame on a frame-to-frame basis at real-time and the second frame includes a current frame.

7. The method of claim 1, wherein the stream of frames is registered on a frame-by-frame basis at real-time.

8. The method of claim 1, wherein extracting segment information for a frame comprises applying an image segmentation algorithm to the frame to extract one or more segments for the frame and generating a segment map to store the one or more segments for the frame.

9. The method of claim 1, wherein the segment information includes one or more segments of cylinder objects, one or more planar patch objects, or one or more smooth surface objects.

10. The method of claim 1, wherein registering the stream of frames based on the segment information comprises:

identifying a plurality of segments of a previous and a subsequent frames based on the segment information;

identifying a plurality of points corresponding to the plurality of segments; and applying an iterative closest point (ICP) algorithm to the plurality of points to minimize a distance between closest points of the plurality of points for the frame registration.

11. The method of claim 1, further comprising applying an iterative closest point (ICP) algorithm to points of each frame in the stream to register the stream of frames.

12. The method of claim 1, wherein the features include information for linearity, planarity, scattering, or omnivariance of the segments.

13. The method of claim 1, wherein the features include one or more eigen-based features.

14. A non-transitory machine-readable medium having instructions stored therein, which when executed by a processor, cause the processor to perform operations, the operations comprising:

receiving a stream of frames of point clouds from one or more LIDAR sensors of an autonomous driving vehicle (ADV) and corresponding poses at real-time;

extracting segment information for each frame of the stream based on geometric or spatial attributes of points in the frame, wherein the segment information includes one or more segments of at least a first frame corresponding to a first pose;

extracting one or more features from each segment of each frame, including features from the first and a second frames;

detecting a loop closure between the first and the second frames based on the extracted features of the first and the second frames;

registering the stream of frames based on the segment information;

in response to detecting the loop closure between the first and second frames, localizing the second frame based on the frame registration; and generating a first point cloud map for the stream of frames based on the frame registration.

15. The non-transitory machine-readable medium of claim 14, further comprising:

updating the first pose based on the localization and the frame registration to generate a second point cloud map.

16. The non-transitory machine-readable medium of claim 14, wherein detecting the loop closure between the first and the second frames comprises applying an unsupervised machine learning algorithm to the features of the segments of the first and the second frames to determine if the two segments match.

17. The non-transitory machine-readable medium of claim 16, wherein detecting the loop closure between the first and the second frames further comprises:

applying a RANSAC algorithm to the first and the second frames to determine if the two segments matches.

18. A data processing system, comprising:

a processor; and a memory coupled to the processor to store instructions, which when executed by the processor, cause the processor to perform operations, the operations including:

receiving a stream of frames of point clouds from one or more LIDAR sensors of an autonomous driving vehicle (ADV) and corresponding poses at real-time;

extracting segment information for each frame of the stream based on geometric or spatial attributes of points in the frame, wherein the segment information includes one or more segments of at least a first frame corresponding to a first pose;

extracting one or more features from each segment of each frame, including features from the first and a second frames;

detecting a loop closure between the first and the second frames based on the extracted features of the first and the second frames;

registering the stream of frames based on the segment information;

in response to detecting the loop closure between the first and second frames, localizing the second frame based on the frame registration; and generating a first point cloud map for the stream of frames based on the frame registration.

19. The system of claim 18, further comprising:

updating the first pose based on the localization and the frame registration to generate a second point cloud map.

20. The system of claim 18, wherein detecting the loop closure between the first and the second frames comprises applying an unsupervised machine learning algorithm to the features of the segments of the first and the second frames to determine if the two segments match.

21. The system of claim 18, wherein detecting the loop closure between the first and the second frames further comprises:

applying a RANSAC algorithm to the first and the second frames to determine if the two segments matches.

* * * * *